(12) United States Patent
Yu

(10) Patent No.: US 10,243,376 B2
(45) Date of Patent: Mar. 26, 2019

(54) STACK DC POWER SUPPLY BATTERY CHARGER

(71) Applicant: SCHNEIDER ELECTRIC IT CORPORATION, West Kingston, RI (US)

(72) Inventor: Qinghong Yu, Carlisle, MA (US)

(73) Assignee: SCHNEIDER ELECTRIC IT CORPORATION, West Kingston, RI (US)

( * ) Notice: Subject to any disclaimer, the term of this patent is extended or adjusted under 35 U.S.C. 154(b) by 204 days.

(21) Appl. No.: 15/182,877

(22) Filed: Jun. 15, 2016

(65) Prior Publication Data

US 2017/0366022 A1 Dec. 21, 2017

(51) Int. Cl.
*H02J 7/00* (2006.01)

(52) U.S. Cl.
CPC ............ *H02J 7/0026* (2013.01); *H02J 7/007* (2013.01)

(58) Field of Classification Search
CPC ................................ H02J 7/0026; H02J 7/007
USPC ........................................................ 320/107
See application file for complete search history.

(56) References Cited

U.S. PATENT DOCUMENTS

| | | | | | |
|---|---|---|---|---|---|
| 3,654,537 | A | * | 4/1972 | Coffey | A61N 1/025 307/109 |
| 5,461,297 | A | * | 10/1995 | Crawford | H02M 3/28 320/166 |
| 5,694,025 | A | * | 12/1997 | Oglesbee | H02J 7/022 320/137 |
| 2012/0235626 | A1 | * | 9/2012 | Oh | H02J 7/0022 320/103 |
| 2017/0366022 | A1 | * | 12/2017 | Yu | H02J 7/007 |

* cited by examiner

*Primary Examiner* — Nathaniel R Pelton
(74) *Attorney, Agent, or Firm* — Lando & Anastasi, LLP

(57) ABSTRACT

According to at least one aspect, embodiments herein provide a method for operating a battery charging system, the method comprising receiving, by a first rectifier, a first AC voltage, receiving, by a second rectifier, a second AC voltage, converting, by the first rectifier, the first AC voltage to a first DC voltage, converting, by the second rectifier, the second AC voltage to a second DC voltage, biasing, by the second rectifier, the first rectifier with the second DC voltage, biasing, by the second rectifier, a battery charger with the second DC voltage, providing, by the first rectifier, a biased voltage to the battery charger, and providing, by the battery charger, a second power to a battery.

14 Claims, 15 Drawing Sheets

STACK DC POWER SUPPLY BATTERY CHARGER

CROSS-REFERENCE TO RELATED APPLICATIONS

This application relates to U.S. patent application Ser. No. 15/182,888 entitled POWER MANAGEMENT UNIT FOR INTELLIGENT TRAFFIC SYSTEM APPLICATIONS, by Brian McKenna, Kaushal J. Patel, Kenneth J. Steeves, Marcel B. Grenier, Qinghong Yu, Jeffrey M. August, James Edward Briggs, Steven Allen Diggins, Jeffrey Steven Young, Devin Patrick Auclair, and James Walter Frey filed on even date herewith and incorporated herein by reference.

BACKGROUND OF DISCLOSURE

1. Field of Disclosure

Embodiments of the present disclosure relate generally to systems and methods for powering and controlling lighting systems in traffic light apparatuses.

2. Discussion of Related Art

Conventional traffic lighting systems have traditionally used incandescent lights for traffic signal lamps since the inception of traffic lighting systems in the early 1900s. Despite their initial prolificacy, incandescent lighting systems suffer from reduced lifetimes and higher energy consumption as compared to modern LED lighting systems, and as LED technology has emerged, LED lighting systems have started to replace traditional incandescent lighting systems in the traffic light industry.

SUMMARY OF DISCLOSURE

At least one aspect of the disclosure is directed to a method for operating a traffic light power management system. In one embodiment, the traffic light power management system includes a backup power source and a service bypass unit removably coupled to a power management unit, the method comprising acts of receiving, by the service bypass unit, AC power from an input, converting, by the service bypass unit in a first mode of operation, the AC power to a first DC power, providing, by the service bypass unit in the first mode of operation, the first DC power to a first output, providing, by the service bypass unit in a second mode of operation, the AC power to the power management unit, converting, by the power management unit in the second mode of operation, the AC power to a second DC power, and providing, by the power management unit in the second mode of operation, the second DC power to the first output.

According to one embodiment, the method further comprises an act of converting, by the power management unit in the second mode of operation, the AC power to a third DC power and a second AC power. In one embodiment the method further comprises an act of removing the power management unit from the traffic light power management system while DC power is provided at the first output. In at least one embodiment, the method further comprises an act of activating a manual switch prior to removing the power management unit from the traffic light power management system.

In at least one embodiment, the method further comprises acts of determining that the AC power is in a sag condition or a swell condition, and entering, by the service bypass unit in response to the determination, a third mode of operation. In an embodiment, the method further comprises acts of providing, by the backup power source in the third mode of operation, a third DC power to the power management unit, converting, by the power management unit in the third mode of operation, the third DC power to a fourth DC power, and providing, by the power management unit in the third mode of operation, the fourth DC power to the first output. In some embodiments, the method further comprises an act of activating, in response to a threshold being exceeded, an automatic switch. In one embodiment, a portion of the AC power is used to charge the backup power source in the second mode of operation.

According to one embodiment, a traffic light power management system is provided. The system comprises a first input configured to receive AC power, a first output, a power management unit removably coupled to a service bypass unit, a backup power source coupled to the power management unit, the service bypass unit being configured to receive the AC power from the first input, convert the AC power to a first DC power in a first mode of operation, provide the first DC power to the first output in the first mode of operation, and provide the AC power to the power management unit in a second mode of operation, and the power management unit, configured to receive, from the service bypass unit, the AC power in the second mode of operation, convert, by the power management unit, the AC power to a second DC power in the second mode of operation, and provide, by the power management unit, the second DC power to the first output in the second mode of operation.

In at least one embodiment, the power management unit is further configured to convert the AC power to a third DC power and a second AC power in the second mode of operation. In one embodiment, the power management unit is configured to be removed from the traffic light power management system while DC power is provided at the first output. In at least one embodiment, the system further comprises a manual switch configured to be activated prior to removing the power management unit. In an embodiment, the service bypass unit is configured to enter a third mode of operation in response to determining that the AC power is in a sag condition or a swell condition.

In some embodiments, the power management unit is further configured to receive a third DC power from the backup power source in the third mode of operation, convert the third DC power to a fourth DC power in the third mode of operation, and provide the fourth DC power to the first output in the third mode of operation. In at least one embodiment, the system further comprises an automatic switch configured to be activated in response to a threshold being exceeded. In some embodiments, a portion of the AC power is used to charge the backup power source in the second mode of operation.

According to one embodiment, a traffic light power management system is provided, the traffic light power management system comprising a first input configured to receive AC power, a first output, a power management unit, a backup power source coupled to the power management unit, and means for providing, in a first mode of operation, a first DC power derived from the AC power received at the first input to the first output bypass the power management unit, providing, by the power management unit in a second mode of operation, a second DC power to the first output, the second DC power provided by the power management unit and derived from the AC power received at the first AC input, and providing, by the power management unit in a backup mode of operation, a third DC power derived from power received from the backup power source to the first output. In an embodiment, the power management unit is removable from the system while DC power is provided at the first output. In some embodiments, the system includes a manual switch configured to be activated prior to removing the power management unit. In an embodiment, the system includes an automatic switch configured to be activated in response to a threshold being exceeded.

At least one aspect of the disclosure is directed to a method for operating a traffic light power management system. In one embodiment, the traffic light power management system includes a backup power source and a service bypass unit removably coupled to a power management unit, the method comprising acts of receiving, by the service bypass unit, AC power from an input, converting, by the service bypass unit in a first mode of operation, the AC power to a first DC power, providing, by the service bypass unit in the first mode of operation, the first DC power to a first output, providing, by the service bypass unit in a second mode of operation, the AC power to the power management unit, converting, by the power management unit in the second mode of operation, the AC power to a second DC power, and providing, by the power management unit in the second mode of operation, the second DC power to the first output.

According to one embodiment, the method further comprises an act of converting, by the power management unit in the second mode of operation, the AC power to a third DC power and a second AC power. In one embodiment the method further comprises an act of removing the power management unit from the traffic light power management system while DC power is provided at the first output. In at least one embodiment, the method further comprises an act of activating a manual switch prior to removing the power management unit from the traffic light power management system.

In at least one embodiment, the method further comprises acts of determining that the AC power is in a sag condition or a swell condition, and entering, by the service bypass unit in response to the determination, a third mode of operation. In an embodiment, the method further comprises acts of providing, by the backup power source in the third mode of operation, a third DC power to the power management unit, converting, by the power management unit in the third mode of operation, the third DC power to a fourth DC power, and providing, by the power management unit in the third mode of operation, the fourth DC power to the first output. In some embodiments, the method further comprises an act of activating, in response to a threshold being exceeded, an automatic switch. In one embodiment, a portion of the AC power is used to charge the backup power source in the second mode of operation.

According to one embodiment, a traffic light power management system is provided. The system comprises a first input configured to receive AC power, a first output, a power management unit removably coupled to a service bypass unit, a backup power source coupled to the power management unit, the service bypass unit being configured to receive the AC power from the first input, convert the AC power to a first DC power in a first mode of operation, provide the first DC power to the first output in the first mode of operation, and provide the AC power to the power management unit in a second mode of operation, and the power management unit, configured to receive, from the service bypass unit, the AC power in the second mode of operation, convert, by the power management unit, the AC power to a second DC power in the second mode of operation, and provide, by the power management unit, the second DC power to the first output in the second mode of operation.

In at least one embodiment, the power management unit is further configured to convert the AC power to a third DC power and a second AC power in the second mode of operation. In one embodiment, the power management unit is configured to be removed from the traffic light power management system while DC power is provided at the first output. In at least one embodiment, the system further comprises a manual switch configured to be activated prior to removing the power management unit. In an embodiment, the service bypass unit is configured to enter a third mode of operation in response to determining that the AC power is in a sag condition or a swell condition.

In some embodiments, the power management unit is further configured to receive a third DC power from the backup power source in the third mode of operation, convert the third DC power to a fourth DC power in the third mode of operation, and provide the fourth DC power to the first output in the third mode of operation. In at least one embodiment, the system further comprises an automatic switch configured to be activated in response to a threshold being exceeded. In some embodiments, a portion of the AC power is used to charge the backup power source in the second mode of operation.

According to one embodiment, a traffic light power management system is provided, the traffic light power management system comprising a first input configured to receive AC power, a first output, a power management unit, a backup power source coupled to the power management unit, and means for providing, in a first mode of operation, a first DC power derived from the AC power received at the first input to the first output bypass the power management unit, providing, by the power management unit in a second mode of operation, a second DC power to the first output, the second DC power provided by the power management unit and derived from the AC power received at the first AC input, and providing, by the power management unit in a backup mode of operation, a third DC power derived from power received from the backup power source to the first output. In an embodiment, the power management unit is removable from the system while DC power is provided at the first output. In some embodiments, the system includes a manual switch configured to be activated prior to removing the power management unit. In an embodiment, the system includes an automatic switch configured to be activated in response to a threshold being exceeded.

BRIEF DESCRIPTION OF THE DRAWINGS

The accompanying drawings are not intended to be drawn to scale. In the drawings, each identical or nearly identical component that is illustrated in various figures is represented by a like numeral. For purposes of clarity, not every component may be labeled in every drawing. In the drawings.

DETAILED DESCRIPTION OF THE DISCLOSURE

Figure 1:
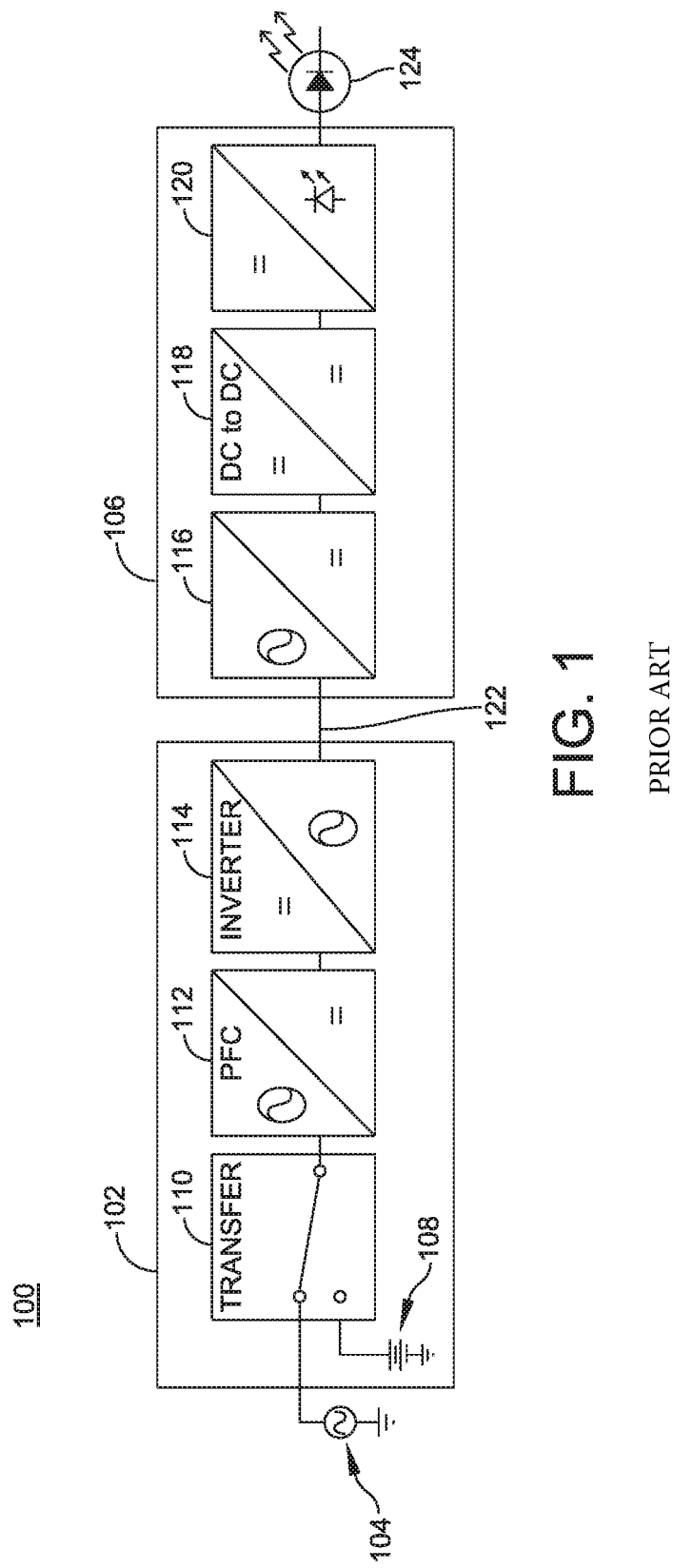
FIG. 1 is a block diagram of a conventional traffic light power supply system.

Embodiments of this invention are not limited in their application to the details of construction and the arrangement of components set forth in the following description or illustrated in the drawings. Embodiments of the invention are capable of other embodiments and of being practiced or of being carried out in various ways. Also, the phraseology and terminology used herein is for the purpose of description and should not be regarded as limiting. The use of "including," "comprising," or "having," "containing," "involving," and variations thereof herein, is meant to encompass the items listed thereafter and equivalents thereof as well as additional items.

The use of antiquated traffic lighting system cabinets in combination with modern LED traffic signal lamps creates opportunities for further optimization. Due to the critical nature of traffic signal systems in directing traffic flow, it is important that traffic signal systems operate as intended. Furthermore, the widespread use of traffic lighting systems necessitates the use of efficient power supply systems to compensate for the high levels of power consumption inherent to a large volume of traffic lighting systems. Existing traffic lighting systems designed for use with incandescent light bulbs, which have been retrofitted with LED traffic signal lamps, suffer from various deficiencies imposed by conventional incandescent light bulb power supplies, as will be described in greater detail below with respect to FIG. 1.

FIG. 1 illustrates a traditional LED traffic light power supply system 100 for powering LED lamps in traffic light systems. The traditional LED traffic light power supply system 100 includes a power supply backup system 102, an AC input 104, a LED power supply system 106 and an LED lamp 124. The power supply backup system 102 includes a DC battery 108, a transfer switch 110, a Power Factor Correction (PFC) stage 112, and an inverter 114. The LED power supply system 106 includes an additional PFC stage 116, a DC-DC converter 118, and an LED power supply 120.

The transfer switch 110 is selectively coupled to the AC input 104 at a first terminal, selectively coupled to the DC battery 108 at a second terminal, and coupled to the PFC stage 112 at a third terminal. The PFC stage 112 is coupled to the transfer switch 110 at a first terminal and the inverter 114 at a second terminal. The inverter 114 is coupled to the PFC stage 112 at a first terminal and is coupled to the additional PFC stage 116 via a protected AC voltage line 122 at a second terminal.

The additional PFC stage 116 is coupled to the inverter 114 via the protected AC voltage line 122 at a first terminal, and the DC-DC converter 118 at a second terminal. The DC-DC converter 118 is coupled to the additional PFC stage 116 at a first terminal and the LED power supply 120 at a second terminal. The LED power supply 120 is coupled to the DC-DC converter 118 at a first terminal, and the LED lamp 124 at a second terminal.

The traditional LED traffic light power supply system 100 discussed above does not provide power to LED lamps in the most efficient configuration possible. For example, the inverter 114 converts DC voltage received from the PFC stage 112 into AC voltage, and provides the AC voltage to the additional PFC stage 116 for conversation from AC voltage back to DC voltage. The DC-AC conversion by the inverter 114 and the subsequent AC-DC conversion by the additional PFC stage 116 are redundant and introduce unnecessary inefficiencies.

Figure 2:
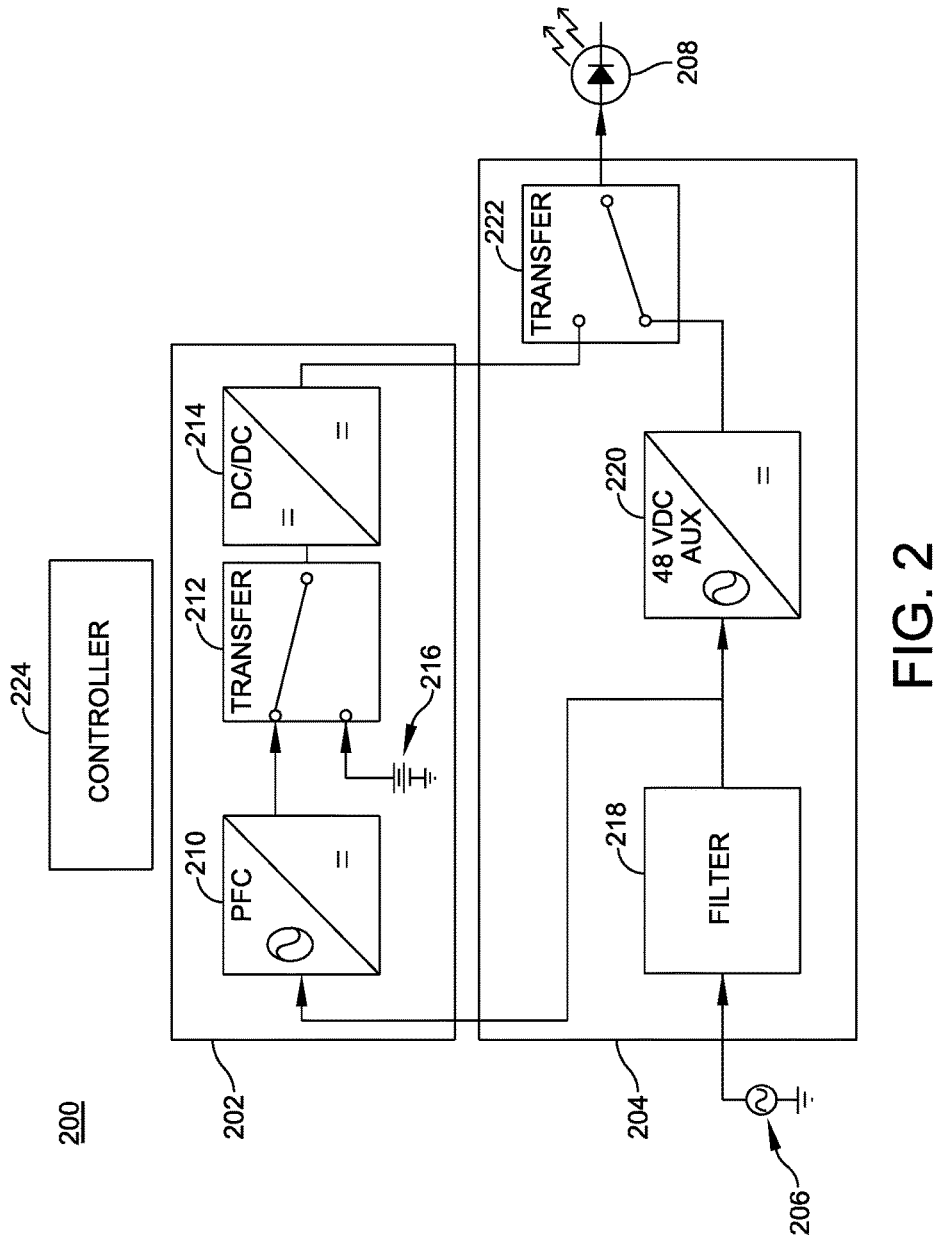
FIG. 2 is a block diagram of a traffic light power supply system in accordance with embodiments of the disclosure.

FIG. 2 represents an improved power management system 200. The power management system 200 includes a Power Management Unit (PMU) 202, a Service Bypass Unit (SBU) 204, an AC input 206, an LED lamp 208 and a controller 224. The PMU 202 includes a PFC stage 210, a transfer switch 212, a DC-DC converter 214 and a DC battery 216. The SBU 204 includes a filter 218, an AC-DC converter 220 and a transfer switch 222.

The filter 218 is coupled to the AC input 206 at a first terminal, and is coupled to the PFC stage 210 and the AC-DC converter 220 at a second terminal. The AC-DC converter 220 is coupled to the filter 218 at a first terminal, and is selectively coupled to the LED lamp 208 via the transfer switch 222 at a second terminal. The transfer switch 222 is selectively coupled to the AC-DC converter 220 at a first terminal, selectively coupled to the DC-DC converter 214 at a second terminal and is coupled to the LED lamp 208 at a third terminal. The DC-DC converter 214 is selectively coupled to the PFC stage 210 and is selectively coupled to the DC battery 216 via the transfer switch 212 at a first terminal and is selectively coupled to the LED lamp 208 via the transfer switch 222 at a second terminal. The transfer switch 212 is coupled to the DC-DC converter 214 at a first terminal, selectively coupled to the DC battery 216 at a second terminal and is selectively coupled to the PFC stage 210 at a third terminal. The PFC stage 210 is selectively coupled to the DC-DC converter 214 via the transfer switch 212 at a first terminal and is coupled to the filter 218 at a second terminal.

Based on the quality of the AC power received at the AC input 206, the power management system 200 is configured to operate in one of several different modes of operation. For example, according to one embodiment, the controller 224 monitors the AC power received at the AC input 206 and, based on the monitored AC power, adjusts the respective states of each of the transfer switch 212 and the transfer switch 222 to switch the power management system 200 between a normal mode of operation, a backup mode of operation, and a bypass mode of operation.

In response to a determination that the AC power received at the AC input 206 is acceptable (e.g., at a desired level), the controller 224 operates the power management system 200 to enter the normal mode of operation. In the normal mode of operation, the controller 224 transmits control signals to operate the transfer switch 212 to couple the PFC stage 210 to the DC-DC converter 214, and operates the transfer switch 222 to couple the DC-DC converter 214 to the LED lamp 208. Accordingly, in the normal mode of operation, AC power received at the AC input 206 is provided to the LED lamp 208 substantially via the PMU 202.

In response to a determination that the AC power received at the AC input 206 is in a sag or swell condition, the controller 224 operates the power management system 200 to enter the backup mode of operation. In the backup mode of operation, the controller 224 transmits control signals to actuate the transfer switch 212 to couple the DC battery 216 to the DC-DC converter 214 and to actuate the transfer switch 222 to couple the DC-DC converter 214 to the LED lamp 208. Accordingly, in the backup mode of operation, DC power stored in the DC battery 216 is provided to the LED lamp 208 substantially via the PMU 202.

In some examples, even if the AC power received at the AC input 206 is determined to be acceptable, the controller 224 may not operate the power management system 200 to enter the normal mode of operation. For example, the controller 224 may determine that a manual or automatic switch has been activated to initiate the bypass mode of operation. In the bypass mode of operation, the controller 224 transmits control signals to actuate the transfer switch 222 to couple the AC-DC converter 220 to the LED lamp 208. Accordingly, in the bypass mode of operation, AC power received at the AC input 206 is provided to the LED lamp 208 substantially via the SBU 204, rather than via the PMU 202. The bypass mode of operation may be initiated, for example, to redirect power away from the PMU 202 through the SBU 204 when power flow through the PMU 202 is undesirable. The bypass mode of operation may be manually initiated (e.g., to perform maintenance on the PMU 202) or automatically initiated (e.g., in response to a failsafe condition being triggered).

Furthermore, the power management system 200 is a modular system capable of operating as intended in the absence of one of more components. For example, the PMU 202 is a modular component that can be removed without compromising the power management system 200. As mentioned above, the bypass mode of operation may be initiated to redirect power away from the PMU 202 through the SBU 204, allowing the PMU 202 to be removed temporarily (e.g., to perform maintenance on the PMU 202) or permanently (e.g., to permanently direct the flow of power through the SBU 204) from the modular power management system 200. In some embodiments, when AC input power is known to be reliable, the power management system 200 may be operated in the bypass mode to provide a more efficient mode of operation.

Figure 3:
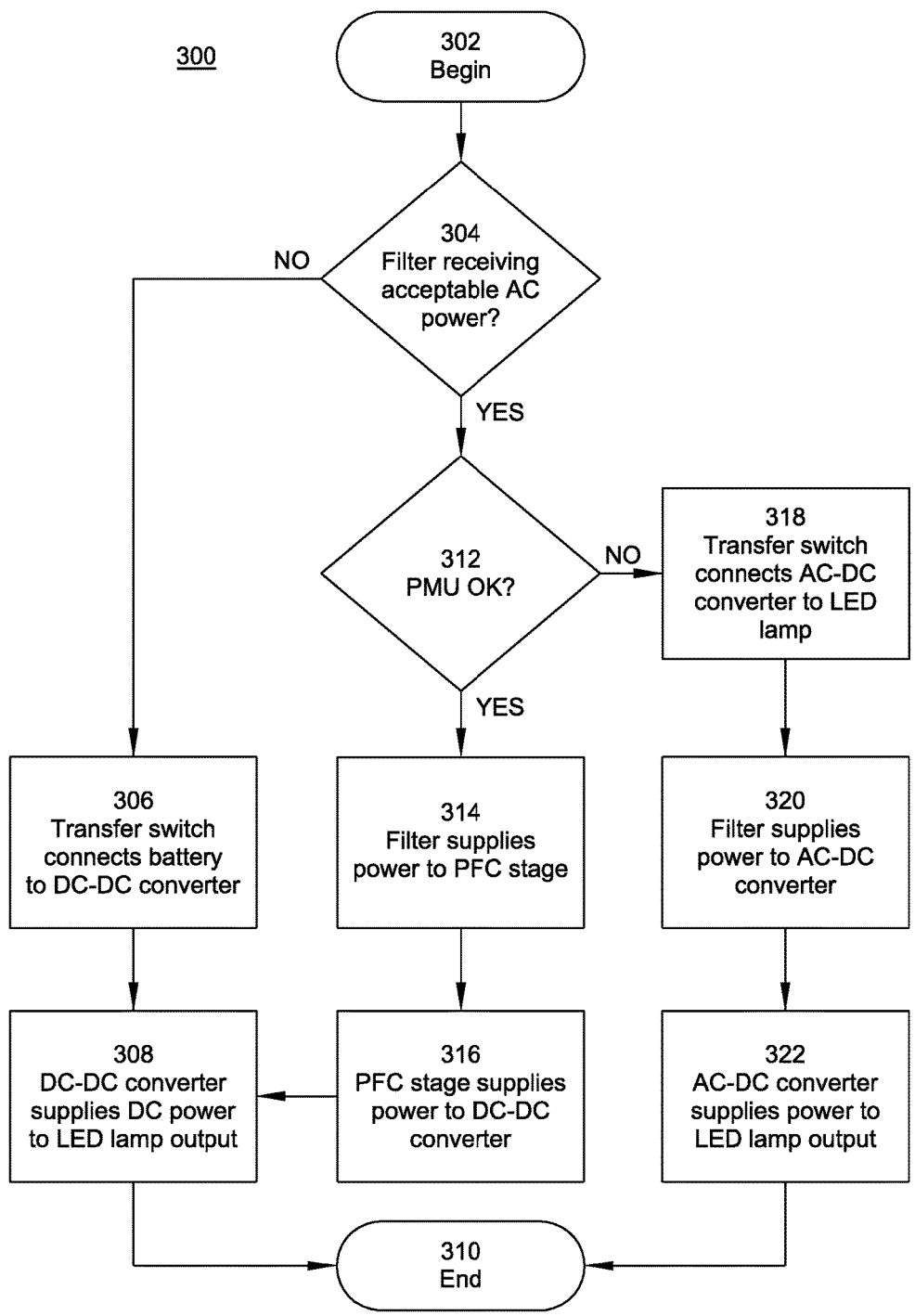
FIG. 3 illustrates a process for controlling power flow in the traffic light power supply system.

FIG. 3 describes a process 300 for controlling the flow of power within the power management system 200 in accordance with the modes of operation discussed above (e.g., the normal mode of operation, the backup mode of operation and the bypass mode of operation). At act 302, the process 300 begins. At act 304, the controller 224 determines whether the filter 218 is receiving AC power from the AC input 206 at an acceptable (e.g., rated) level. If the filter 218 is not receiving acceptable AC power from the AC input 206 (304 NO), then the process 300 continues to act 306 to initiate the backup mode of operation. At act 306, the controller 224 actuates the transfer switch 212 to decouple the PFC stage 210 from the DC-DC converter 214 and to couple the DC battery 216 to the DC-DC converter 214.

Continuing to act 308, the DC-DC converter 214 receives DC power from the DC battery 216, converts the DC power to the same or a different power level, and supplies the converted DC power to the LED lamp 208 via the transfer switch 222. At act 310, the process ends.

Returning to act 304, if the controller 224 determines that the filter 218 is receiving acceptable AC power (304 YES), then the process 300 continues to act 312. At act 312, the controller 224 determines whether the PMU 202 is in an uncompromised state (e.g., as indicated by the PMU 202 transmitting a "PMU OK" signal). If the PMU 202 is in an uncompromised state (312 YES), then the process continues to act 314. At act 314, the filter 218 filters AC power received from the AC input 206, and supplies the filtered power to the PFC stage 210. At act 316, the PFC stage 210 receives the filtered power, corrects the power factor of the AC power, converts the corrected power to DC power, and supplies the DC power to the DC-DC converter 214 via the transfer switch 212. The process 300 continues to act 308, and the DC-DC converter 214 supplies the corrected DC power to the LED lamp 208 via the transfer switch 222.

Returning to act 312, if the PMU 202 is in a compromised state (312 NO), then the controller 224 actuates the transfer switch 222 to couple the AC-DC converter 220 to the LED lamp 208 at act 318. Accordingly, power received from the AC input 206 is redirected through the SBU 204 to the LED lamp 208 to bypass the PMU 202. The process 300 continues to act 320, and the filter 218 supplies power to the AC-DC converter 220. At act 322, the AC-DC converter 220 supplies power to the LED lamp 208 via the transfer switch 222. The process 300 ends at act 310.

Figure 4:
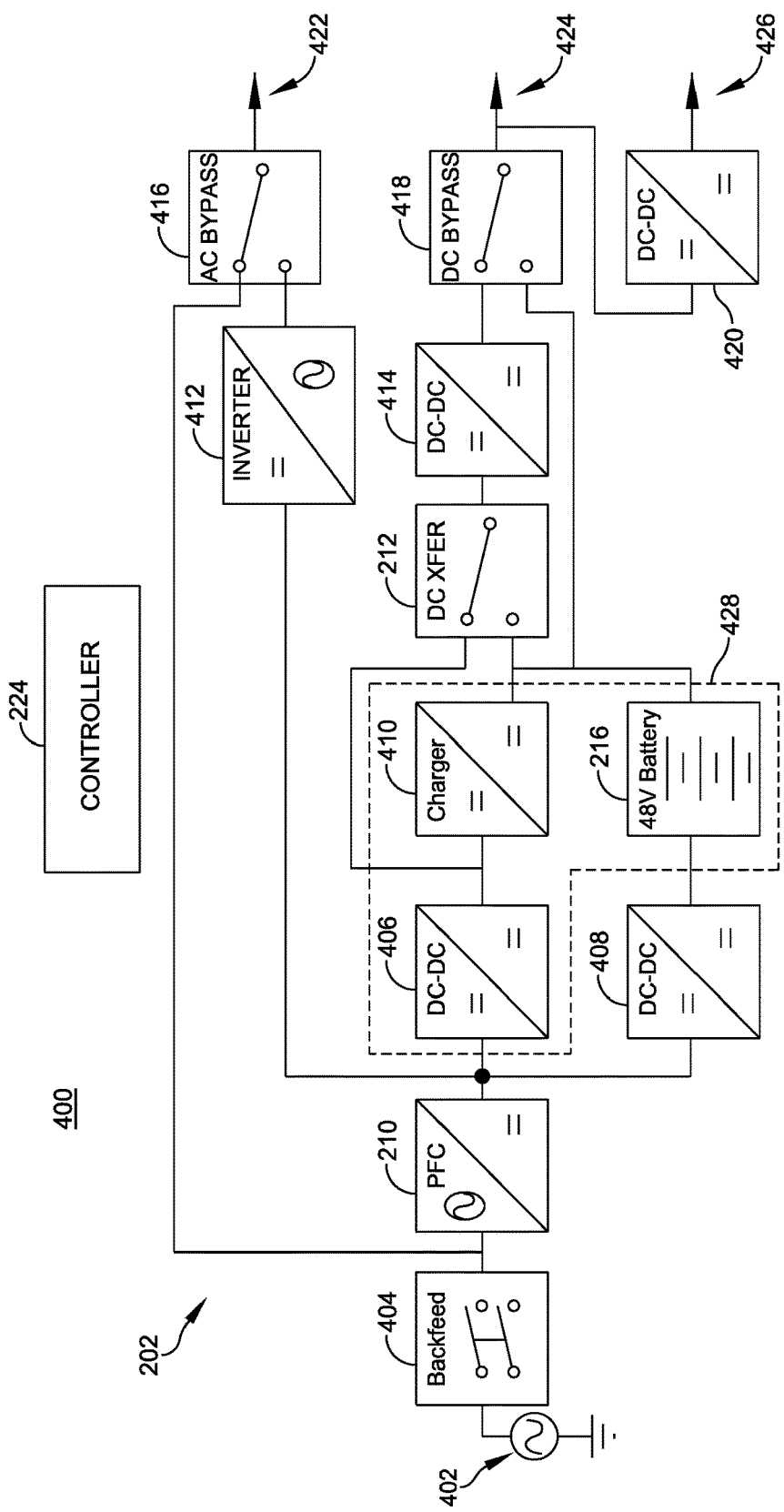
FIG. 4 is a block diagram of a power management unit in accordance with embodiments of the disclosure.

FIG. 4 illustrates a block diagram 400 of the PMU 202 in greater detail according to aspects of the current disclosure. The PMU block diagram 400 includes an AC input 402, backfeed protection 404, a first DC-DC converter 406, a second DC-DC converter 408, a charger 410, an inverter 412, a third DC-DC converter 414, an AC bypass switch 416, a DC bypass switch 418, a fourth DC-DC converter 420, an AC output 422, a first DC output 424, a second DC output 426, the PFC stage 210, the transfer switch 212, the DC battery 216, and the controller 224. The first DC-DC converter 406, the charger 410 and the DC battery 216 together comprise a charging system 428, as described in greater detail below with reference to FIGS. 12 and 13.

The AC input 402 is configured to be coupled to the backfeed protection 404 at a first terminal. The backfeed protection 404 is coupled to the AC input 402 at a first terminal, is connected to the PFC stage 210 at a second terminal and is selectively coupled to the AC output 422 via the AC bypass switch 416 at the second terminal. The PFC stage 210 is coupled to the backfeed protection 404 at a first terminal, and is coupled to the first DC-DC converter 406 at a second terminal. The inverter 412 is selectively coupled to the AC output 422 via the bypass switch 416 at a first terminal, and is coupled to the second DC-DC converter 408 at a second terminal. The first DC-DC converter 406 is coupled to the PFC stage 210 at a first terminal, is coupled to the charger 410 at a second terminal and is selectively coupled to the third DC-DC converter 414 via the transfer switch 212 at the second terminal. The second DC-DC converter 408 is coupled to the inverter 412 at a first terminal and is coupled to the DC battery 216 at a second terminal. The charger 410 is coupled to the first DC-DC converter 406 at a first terminal and is coupled to the DC battery 216 at a second terminal.

The DC battery 216 is selectively coupled to the third DC-DC converter 414 via the transfer switch 212 at a first terminal, selectively coupled to the first DC output 424 and the fourth DC-DC converter 420 via the DC bypass switch 418 at the first terminal, is coupled to the charger 410 at the first terminal and is coupled to the second DC-DC converter 408 at a second terminal. The transfer switch 212 is selectively coupled to the first DC-DC converter 406 at a first terminal, is selectively coupled to the DC battery 216 at a second terminal and is coupled to the third DC-DC converter 414 at a third terminal. The AC bypass switch 416 is selectively coupled to the backfeed protection 404 at a first terminal, is selectively coupled to the inverter 412 at a second terminal, and is coupled to the AC output 422 at a third terminal. The DC bypass switch 418 is selectively coupled to the third DC-DC converter 414 at a first terminal, is selectively coupled to the DC battery 216 at a second terminal, and is coupled to the first DC output 424 and the fourth DC-DC converter 420 at a third terminal. The fourth DC-DC converter 420 is selectively coupled to the third DC-DC converter 414 and to the DC battery 216 via the DC bypass switch 418 at a first terminal, and is coupled to the second DC output 426 at a second terminal.

The controller 224 controls the power output(s) of the PMU 202 by providing control signals to the AC bypass switch 416, the DC bypass switch 418, the transfer switch 212, the charger 410 and the DC battery 216, as discussed in greater detail below with respect to FIG. 5. The controller also provides control signals to other modules in the PMU 202 to control voltages provided by the modules. The PMU 202 is operable to supply at least three output voltages (e.g., to AC output 422, first DC output 424 and second DC output 426) in one of at least three different modes of operation (e.g., in a normal mode of operation, in a component bypass mode of operation and in a backup mode of operation).

In some embodiments, the AC output 422 is operable to supply AC voltage via the backfeed protection 404 at substantially the same voltage level as the voltage level received from the AC input 402 (e.g., 120V AC). The AC voltage can be used to provide AC power to other devices contained within an overall traffic control unit and/or provide power to an AC convenience outlet.

Furthermore, in some embodiments the first DC output 424 is operable to supply DC voltage at a first level (e.g., 48V) to provide power to an LED lamp (e.g., LED lamp 208). The second DC output 426 is operable to supply DC voltage at a second level (e.g., 24V) to provide power to loads that require a voltage level smaller than the first voltage level, such as a logic power supply or other components.

Figure 5:
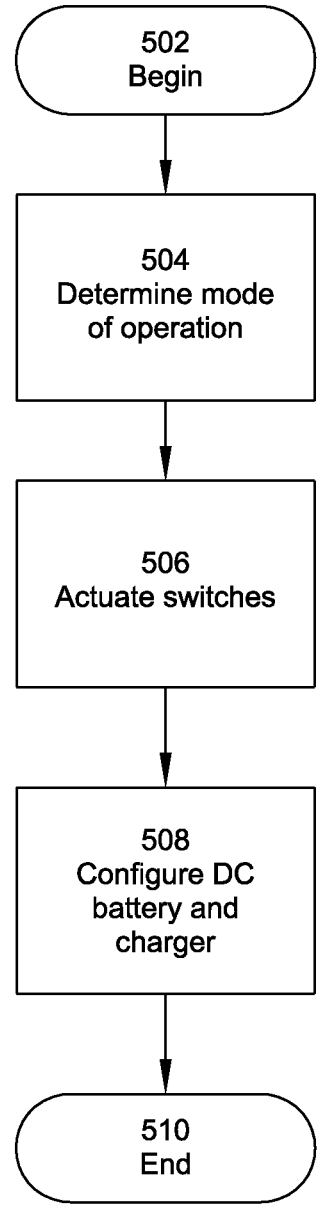
FIG. 5 illustrates a process for configuring elements of the power management unit.

FIG. 5 illustrates a process 500 executed by the controller 224 to control the flow of power within the PMU 202. At act 502, the process 500 begins. At act 504, the controller 224 determines the mode of operation in which to operate the PMU 202. As discussed above, in response to a determination by the controller 224 that the AC power received at the AC input 402 is acceptable (e.g., at a desired level), the controller 224 may operate the PMU 202 to operate in the normal mode of operation. In the normal mode of operation, the controller 224 is configured to direct the flow of AC power received from the AC power input 402 at least partially to one or all of the AC output 422, the first DC output 424 and the second DC output 426. Furthermore, at least some of the AC power received from the AC power input 402 is utilized by the charger 410 to charge the DC battery 216 with DC power at a desired rate.

As previously mentioned, in response to a determination that the AC power received from the utility source is in a sag or swell condition, the controller 224 operates the PMU 202 to enter the backup mode of operation. In the backup mode of operation, the DC battery 216 is operable to supply DC power when AC power is unavailable from the AC power input 402, and the DC power is used, at least partially, to supply power to one or more of the AC output 422, the first DC output 424 and the second DC output 426.

The controller 224 is further operable to evaluate component integrity at act 504 to determine if the PMU 202 should enter a component bypass mode of operation. For example, if the controller 224 determines that the integrity of a component (e.g., the inverter 412, the third DC-DC converter 414, etc.) has been compromised, then the component integrity information can be used by the controller 224 to redirect the flow of power and bypass the compromised component, as discussed in greater detail below with respect to FIG. 8.

At act 506, the controller 224 actuates all appropriate switches to a desired state. For example, to select the state of the AC bypass switch 416, the controller 224 may have determined at act 504 that the PMU 202 is operating in a component bypass mode of operation. Based on this information, the controller 224 actuates the AC bypass switch 416 to couple the inverter 412 to the AC output 422. Otherwise, if the PMU 202 is operating in a normal mode of operation, then the controller 224 actuates the AC bypass switch 416 to couple the backfeed protection 404 to the AC output 422.

To select the state of the transfer switch 212, the controller 224 uses information determined at act 504 regarding a present mode of operation of the PMU 202. If the PMU 202 is operating in a normal mode of operation, then the controller 224 actuates the transfer switch 212 to couple the first DC-DC converter 406 to the third DC-DC converter 414. Otherwise, in the backup mode of operation, the controller 224 actuates the transfer switch 212 to couple the DC battery 216 to the third DC-DC converter 414.

To select the state of the DC bypass switch 418, the controller 224 uses information determined at act 504 regarding the present mode of operation of the PMU 202. In the normal mode of operation, the controller 224 actuates the DC bypass switch 418 to couple the third DC-DC converter 414 to the first DC output 424 and to the fourth DC-DC converter 420. Otherwise, the controller 224 determines whether the third DC-DC converter 414 is in a compromised condition. If the third DC-DC converter 414 is in a compromised condition (i.e., in a component bypass mode of operation), the controller 224 actuates the DC bypass switch 418 to couple the DC battery 216 to the first DC output 424 and the fourth DC-DC converter 420. Otherwise, if the third DC-DC converter 414 is operating in the backup mode of operation, the controller 224 actuates the DC bypass switch 418 to couple the third DC-DC converter 414 to the first output 424 and to the fourth DC-DC converter 420.

At act 508, the controller 224 configures the DC battery 216 and the charger 410. For example, if the controller 224 determines at act 504 that the PMU 202 is operating in a normal mode of operation, the controller 224 uses this information to configure the charger 410 to charge the DC battery 216 with DC power received from the first DC-DC converter 406. Otherwise, if the controller 224 determines at act 504 that the PMU 202 is operating in a backup mode of operation, then the controller 224 uses this information to configure the charger 410 to stop charging the DC battery 216. The operation of the charger 410, as well as several improvements thereto, is described in greater detail below with reference to FIGS. 12 and 13. The controller 224 further operates the DC battery 216 to supply DC power to the second DC-DC converter 408 in the backup mode of operation, and supply power to either the third DC-DC converter 414 or the first DC output 424 and the fourth DC-DC converter 420, depending on the state of the DC bypass switch 418 as discussed above. The process 500 ends at act 510.

Figure 6:
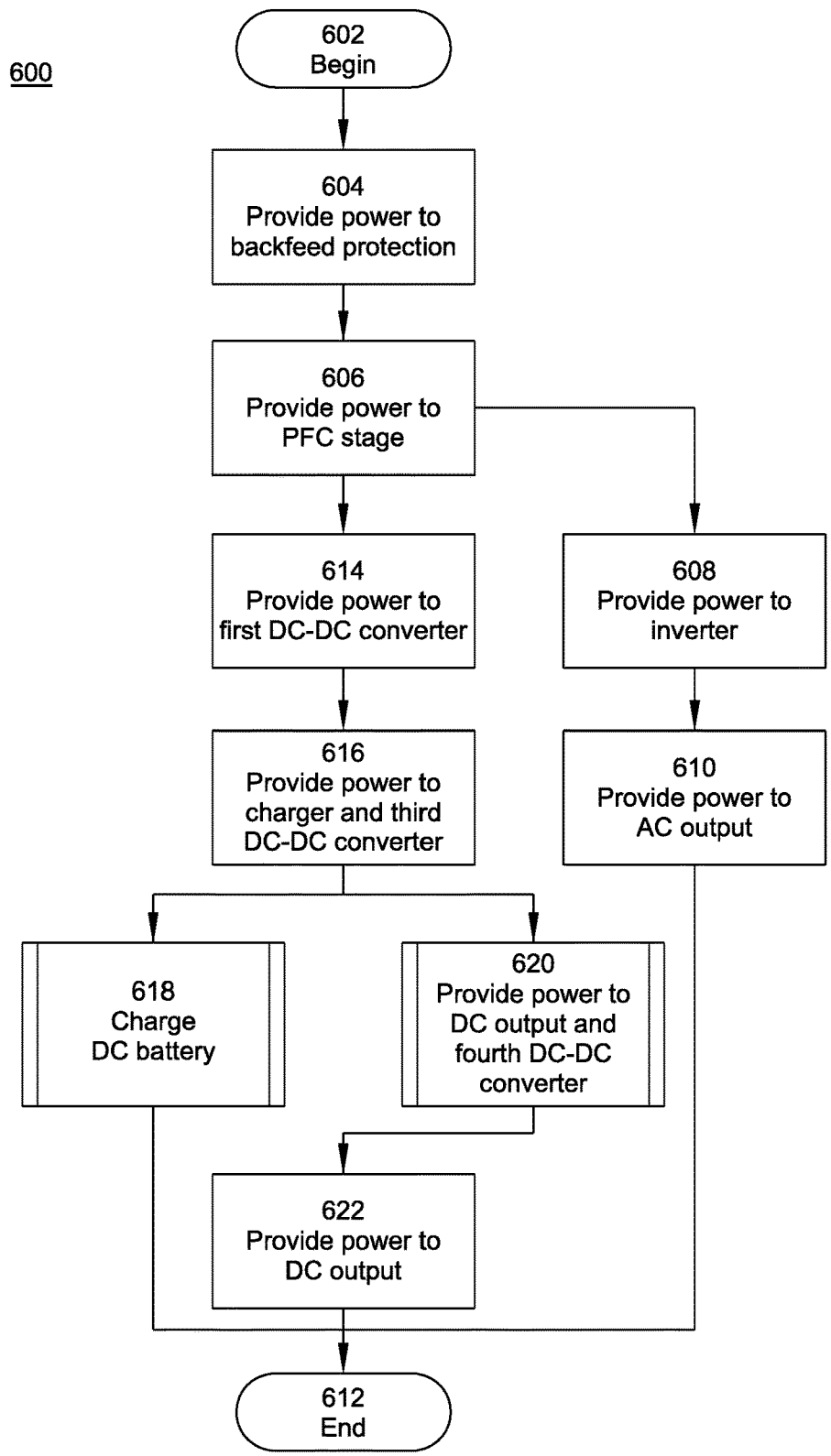
FIG. 6 illustrates a process for controlling power flow in the power management unit in a normal operating mode.

FIG. 6 illustrates a process 600 describing the flow of power in the PMU 202 in the normal mode of operation. As discussed above, during the normal mode of operation the PMU 202 is operable to receive AC power (e.g., AC power rated at 120V AC) from the AC input 402 and supply the AC power to the charger 410 and one or more of the AC output 424, the first DC output 424 and the second DC output 426. At act 602, the process 600 begins. At act 604, the AC input 402 provides AC power (e.g., rated at 120V AC) to the backfeed protection 404. The backfeed protection 404 is operable, in some embodiments, to prevent the PMU 202 from backfeeding power to the AC input 402. At act 606, the backfeed protection 404 provides the received AC power to the PFC stage 210. In alternate embodiments, the backfeed protection 404 may be operable to provide the received AC power directly to the AC output 422 via the AC bypass switch 416, as described in more detail below. The PFC stage 210 is operable to provide supplemental conditioning of the received AC power, convert the conditioned AC power to DC power (e.g., DC power rated at 191V DC, 210V DC, etc.), and, at act 608, provide the DC power to the inverter 412. The inverter 412 converts the received DC power to AC power, and at act 610, the inverter 412 provides the AC power to the AC output 422 via the AC bypass switch 416. At act 612, the process 600 ends.

Returning to act 606, the process 600 continues to act 614. At act 614, the PFC stage 210 provides the DC power to the first DC-DC converter 406, whereby the first DC-DC converter 406 converts the received DC power to a different (e.g., higher or lower) power level (e.g., DC power at 48V DC). At act 616, the first DC-DC converter 406 provides converted DC power to the third DC-DC converter 414 via the transfer switch 212 and to the charger 410. At act 618, the charger 410 charges the DC battery 216 with power received from the first DC-DC converter 406. At act 612, the process 600 ends.

Returning to act 616, the process 600 continues to act 620. At act 620, the third DC-DC converter 414 regulates the DC power received from the first DC-DC converter 406, and provides the regulated DC power to the first DC output 424 and to the fourth DC-DC converter 420 via the DC bypass switch 418. At act 622, the fourth DC-DC converter 420 receives the regulated DC power, converts the regulated DC power to a different (e.g., higher or lower) voltage level (e.g., 24V DC), and provides the converted DC power to the second DC output 426. At act 612, the process 600 ends.

Figure 7:
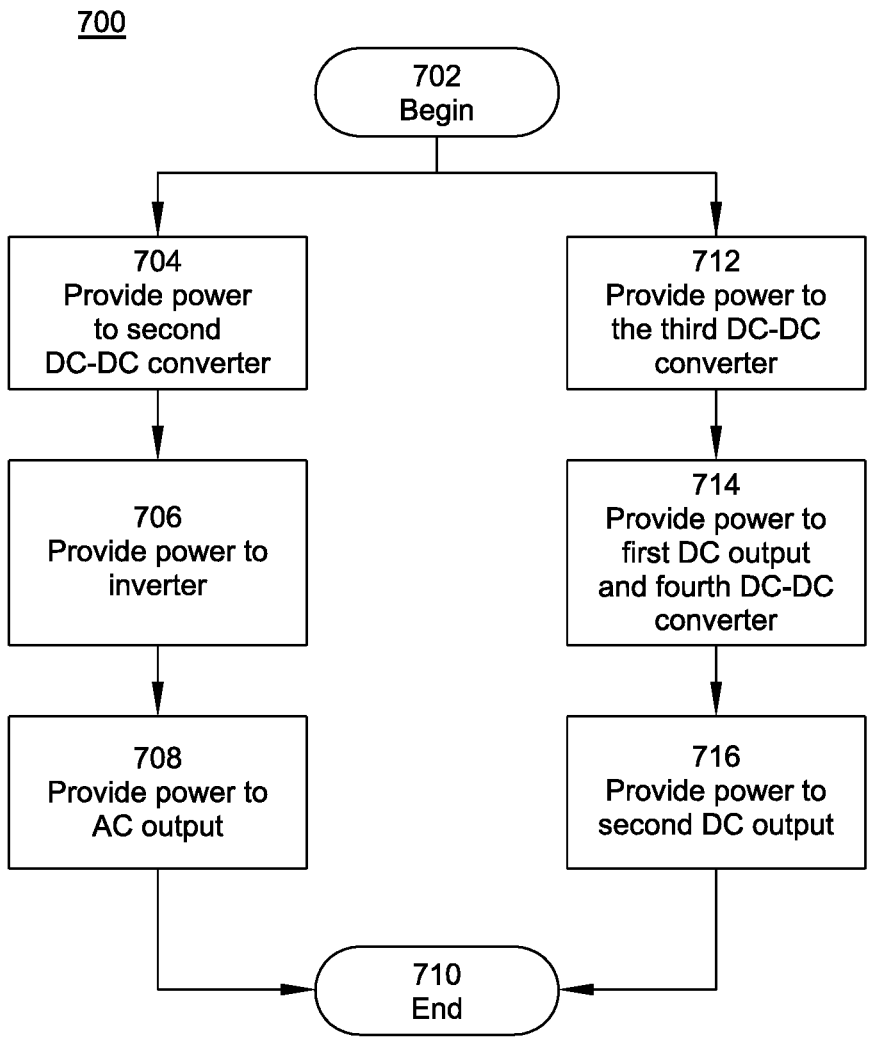
FIG. 7 illustrates a process for controlling power flow in a backup operating mode.

FIG. 7 illustrates a process 700 describing the flow of power within the PMU 202 in the backup mode of operation. As discussed above, in the backup mode of operation, the DC battery 216 is operable to supply DC power to one or more of the AC output 422, the first DC output 424 and the second DC output 426 when AC power from the AC input 402 is unavailable or unacceptable. At act 702, the process 700 begins. At act 704, the DC battery 216 provides DC power (e.g., DC power rated at 48V DC) to the second DC-DC converter 408, and the second DC-DC converter 408 converts the received DC power to DC power at a different power level (e.g., DC power rated at 191V DC, 210V DC, etc.).

At act 706, the second DC-DC converter 408 provides converted DC power to the inverter 412. At act 708, the inverter 412 converts received DC power to AC power (e.g., rated at 120V AC), and provides the AC power to the AC output 422 via the AC bypass switch 416. At act 710, the process 700 ends.

Returning to act 702, the process 700 continues to act 712. At act 712, the DC battery 216 provides DC power to the third DC-DC converter 414. At act 714, the third DC-DC converter 414 regulates the received DC power and provides the regulated DC power to the first DC output 426 and to the fourth DC-DC converter 714. At act 716, the fourth DC-DC converter 420 receives the regulated DC power, converts the regulated DC power to a different power level (e.g., 24V DC), and provides the converted power to the second DC output 426.

Accordingly, in the backup mode of operation, the controller 224 is operable to control the distribution of power from the DC battery 216 to the power outputs (e.g., the AC output 422, the first DC output 424, and the second DC output 426). The controller 224 can further decide, based on the remaining supply of energy in the DC battery 216, to curtail or cut off the supply of power to one or more of the power outputs. For example, the controller 224 may be configured to make a decision to prioritize supplying power to the first DC output 424 by reducing or eliminating the amount of power supplied to the second DC output 426 in low-energy situations. A power output's priority level can be set manually, or the controller 224 may be operable to automatically determine a power output priority level.

Furthermore, in some embodiments, the controller 224 is operable to follow a specific output startup sequence. For example, the controller 224 may be operable to ensure that power is supplied to the AC output 422 before power is supplied to the first DC output 424, so as to avoid overloading the current output capabilities of the PMU 202. Conversely, the controller 224 is also operable to follow a specific output shutdown sequence. A uniform startup or shutdown sequence can, in some examples, alleviate or eliminate problems associated with unanticipated subsystem interactions that arise during startup and shutdown procedures.

Figure 8:
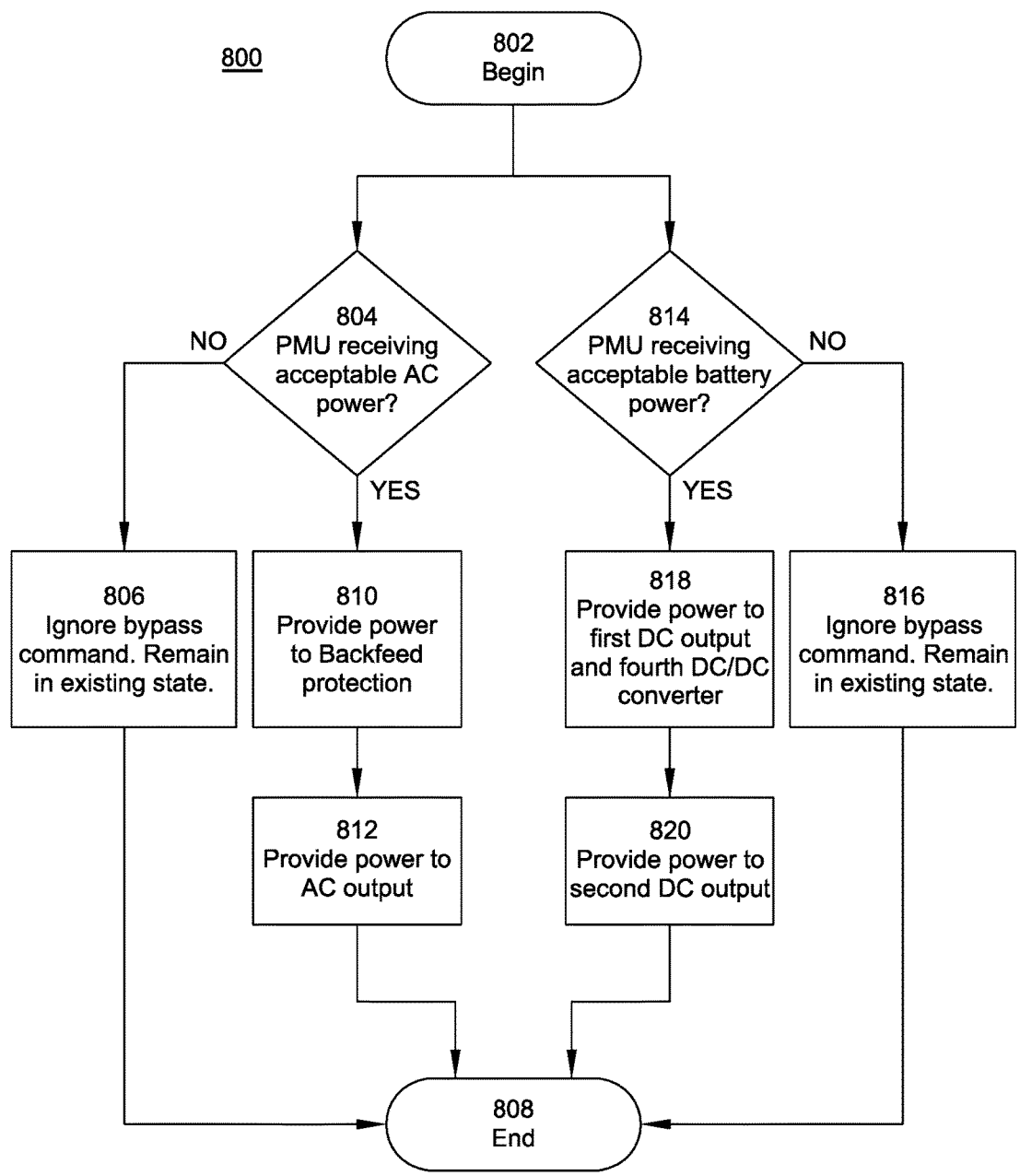
FIG. 8 illustrates a process for controlling power flow in a component bypass operating mode.

FIG. 8 illustrates a process 800 describing the flow of power within the PMU 202 in a component bypass mode of operation. As discussed above, the controller 224 is operable to execute the component bypass mode of operation to redirect power from one or more components, for example, in the event that the integrity of one or more components (e.g., the third DC-DC converter 414) has been compromised during execution of the normal mode of operation or the backup mode of operation.

At act 802, the process 800 begins. The process 800 can be initiated responsive to, for example, the PMU 202 receiving a command to enter a component bypass mode. At act 804, a determination is made as to whether the PMU 202 is receiving acceptable AC power from the AC input 402. If the PMU 202 is not receiving acceptable AC power (804 NO), then the process 800 continues to act 806. At act 806, the PMU 202 is operable to ignore the command to enter the component bypass mode of operation and to remain in a mode of operation in which the PMU 202 operates prior to receiving the command to enter the component bypass mode of operation (e.g., a normal mode of operation, a bypass mode of operation, etc.). The process 800 continues to act 808, whereby the process 800 ends.

Ignoring the command to enter the component bypass mode of operation responsive to detecting the receipt of unacceptable power is a feature implemented in certain embodiments to avoid incorrect classification of functional components as non-functional. For example, the component bypass mode may be initiated responsive to detecting low-quality power at a PMU 202 output. However, if it is determined that the PMU 202 is not receiving acceptable power (e.g., at act 804), then the component bypass mode is ignored, as the low-quality power output by the PMU 202 is likely attributable to the unacceptable power received by the PMU 202, rather than a malfunctioning component.

Returning to act 804, if the PMU 202 is receiving acceptable AC power (804 YES), then the process 800 continues to act 810. At act 810, the AC input 402 provides AC power to the backfeed protection 404. At act 812, the backfeed protection 404 provides AC power to the AC output 422 via the AC bypass switch 416. At act 808, the process 800 ends.

Returning to act 802, the process 800 continues to act 814. At act 814, the PMU 202 evaluates whether acceptable DC power is being received from the DC battery 216. For example, if the PMU 202 is not receiving acceptable AC power, then the PMU 202 may be receiving DC power from the DC battery 216 in lieu of the AC input 402. If the PMU 202 is not receiving acceptable DC power from the DC battery 216 (814 NO), then the process 800 continues to act 816. At act 816, the PMU 202 ignores any commands to enter the component bypass mode of operation and remains in a mode of operation in which the PMU 202 operates prior to receiving a command to enter the component bypass mode of operation. The process 800 ends at act 808.

Otherwise, if the PMU 202 is receiving acceptable DC power from the DC battery 216 (814 YES), then the process 800 continues to act 818. At act 818, the DC battery 216 provides DC power to the first DC output 424 and to the fourth DC-DC converter 420 via the DC bypass switch 418. At act 820, the fourth DC-DC converter 420 converts the received power to a different power level (e.g., to 24V DC) and provides DC power to the second DC output 426. At act 808, the process 800 ends.

Figure 9:
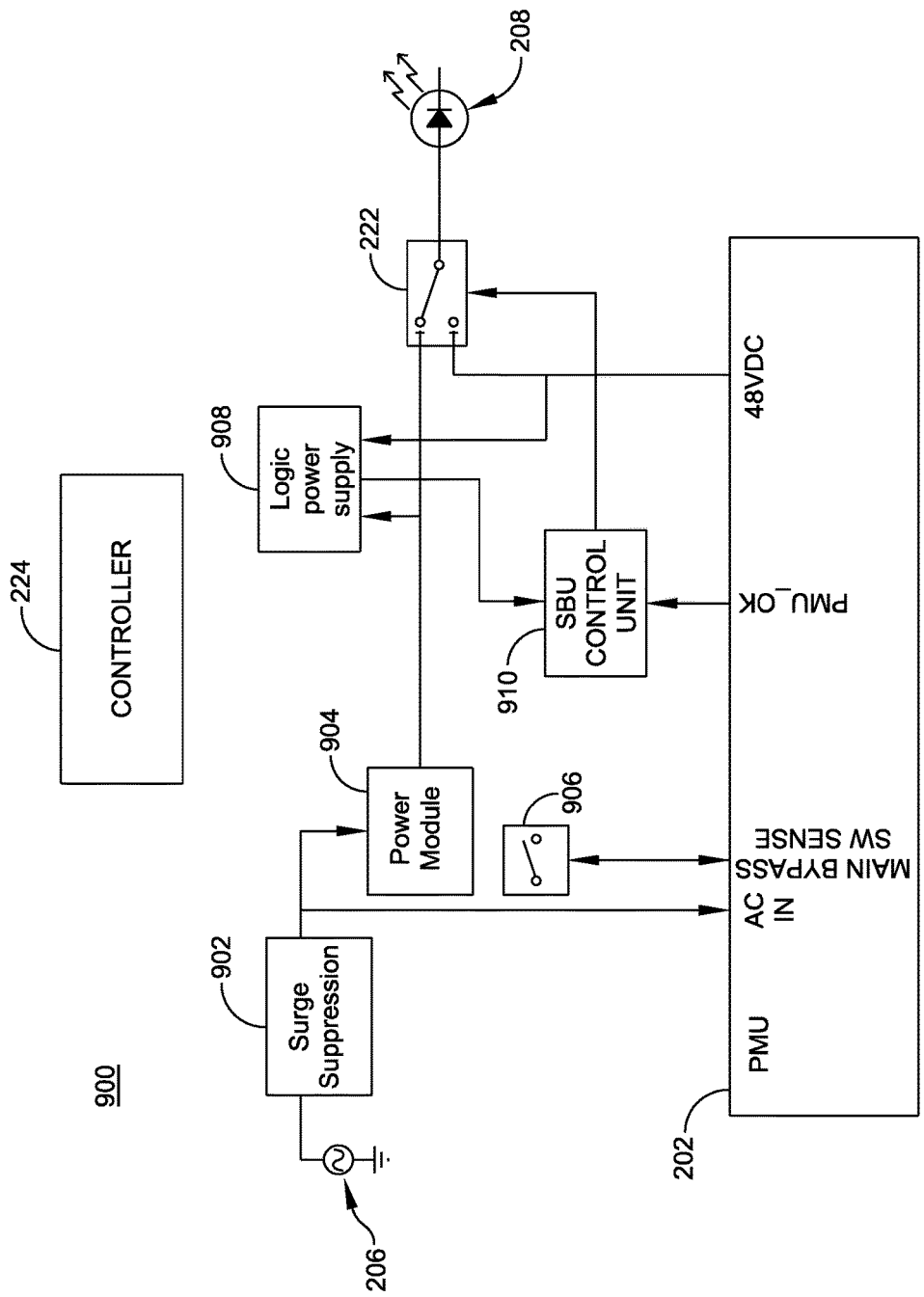
FIG. 9 is a block diagram of a standby bypass unit in accordance with embodiments of the disclosure.

FIG. 9 illustrates a more detailed block diagram 900 of the SBU 204. The SBU block diagram 900 includes the AC input 206, a surge suppression element 902, a power module 904, a maintenance switch 906, a logic power supply 908, an SBU control unit 910, the PMU 202, the transfer switch 222, the LED lamp 208 and the controller 224.

The AC input 206 is coupled to the surge suppression element 902 at a first terminal. The surge suppression element 902 is coupled to the AC input 206 at a first terminal, and coupled to the PMU 202 and the power module 904 at a second terminal. The power module 904 is coupled to the surge suppression element 902 at a first terminal, coupled to a logic power supply 908 at a second terminal and is selectively coupled to the LED lamp 208 via the transfer switch 222 at the second terminal. The logic power supply 908 is coupled to the power module 904 at a first terminal, coupled to the SBU control unit 910 at a second terminal and is coupled to the PMU 202 at a third terminal.

The transfer switch 222 is selectively coupled to the power module 904 at a first terminal, selectively coupled to the PMU 202 at a second terminal, is coupled to the LED lamp 208 at a third terminal and is coupled to the SBU control 910 at a fourth terminal. The LED lamp 208 is selectively coupled to the power module 904 at a first terminal and is selectively coupled to the PMU 202 at the first terminal. The maintenance switch 906 is coupled to the PMU 202 at a first terminal. The SBU control unit 910 is coupled to the logic power supply 908 at a first terminal, coupled to the PMU 202 at a second terminal and is coupled to the transfer switch 222 at a third terminal. The PMU 202 is coupled to the surge suppression element 902 at a first terminal, coupled to the maintenance switch 906 at a second terminal, coupled to the SBU control unit 910 at a third terminal, is selectively coupled to the LED lamp 208 via the transfer switch 222 at a fourth terminal, and is coupled to the logic power supply 908 at the fourth terminal.

As discussed above with respect to FIG. 3, the SBU 204 is operable to supply power to the LED lamp 208 when it is undesirable to supply power via the PMU 202. For example, responsive to the maintenance switch 906 being actuated to a closed position, power can be supplied by the SBU 204 in lieu of the PMU 202. In an alternate example, power can be supplied by the SBU 204 in lieu of the PMU 202 responsive to the maintenance switch 906 being actuated to an open position. The maintenance switch 906 may be proximate to the SBU 204, or may be located and operated remote from the SBU 204. Furthermore, in response to a PMU failsafe condition being triggered (e.g., due to a critical failure of a PMU 202 component), the PMU 202 is operable to send a bypass signal to the SBU control unit 910. In response to receiving the bypass signal, the SBU control unit 910 is operable to actuate the transfer switch 222 to redirect the flow of power around the PMU 202.

Figure 10:
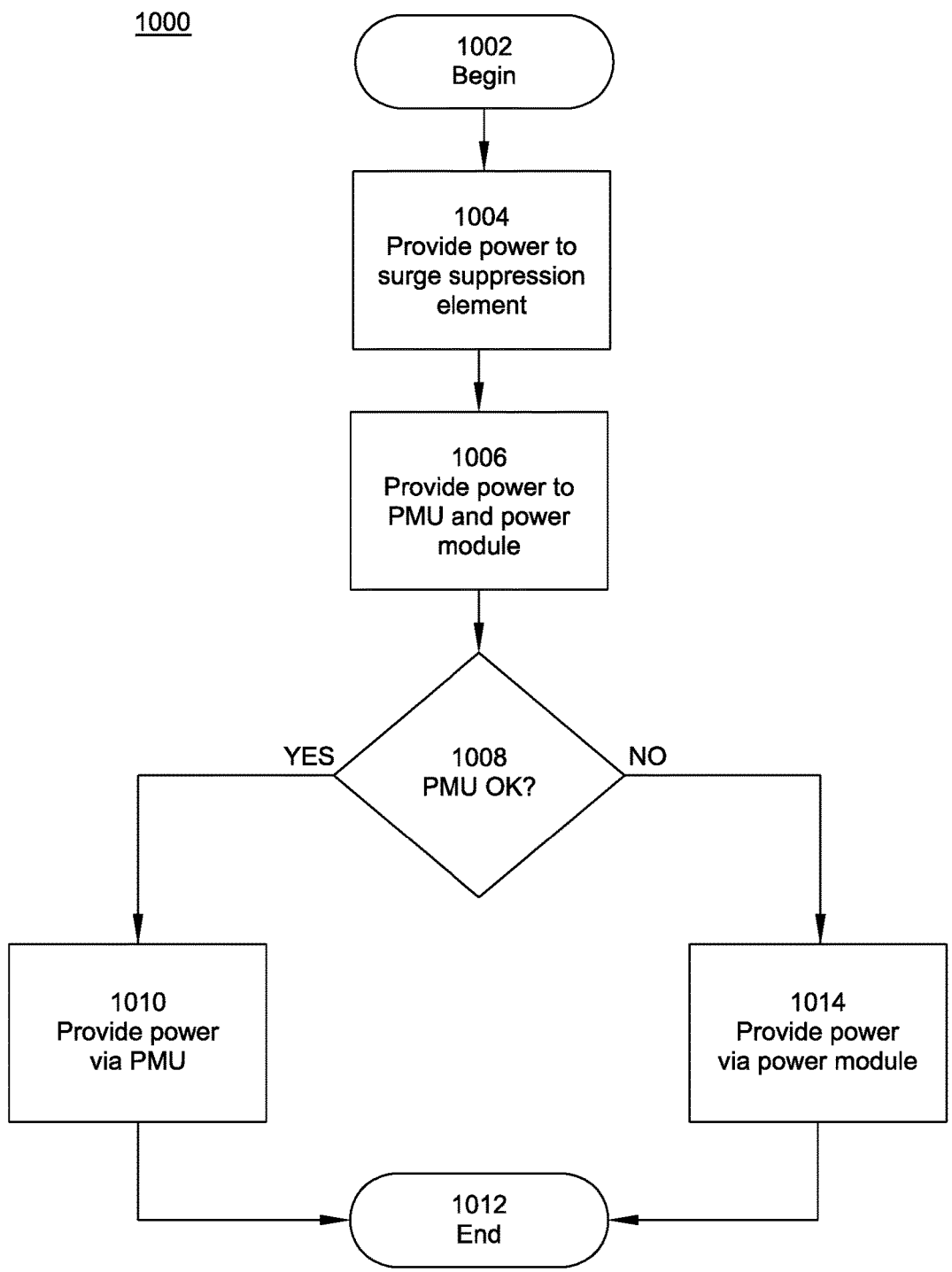
FIG. 10 illustrates a process for controlling power flow in the standby bypass unit.

FIG. 10 illustrates a process 1000 executed by the controller 224 to control the flow of power within the SBU 204. As discussed in greater detail below, the flow of power in the SBU 204 is controlled substantially by the state of the transfer switch 222, and the state of the transfer switch 222 is controlled substantially by the SBU control unit 910. Furthermore, the SBU control unit 910 receives logic state signals from the PMU 202 to select the state of the transfer switch 222. The SBU control unit 910 receives power substantially from the logic power supply 908.

At act 1002, the process 1000 begins. At act 1004, the AC input 206 provides AC power to the surge suppression element 902. The surge suppression element 902 is operable to protect the SBU 204 and the PMU 202 in the event of an overvoltage event (e.g., a surge event), by preventing dangerous, high-voltage power from accessing to the PMU 202 and the SBU 204. At act 1006, if the AC power received from the AC input 206 is determined to be acceptable (e.g., not in a surge condition), then the surge suppression element 902 provides the AC power to the power module 904 and to the PMU 202.

At act 1008, a determination is made as to whether the PMU 202 is in an uncompromised state (e.g., as indicated by the PMU 202 sending a "PMU OK" signal to the SBU control unit 910). If the PMU 202 is in an uncompromised state (1008 YES), then the process 1000 continues to act 1010. At act 1010, DC power is supplied from the PMU 202 to the LED 208 via the transfer switch 222, and from the PMU 202 to the logic power supply 908. At act 1012, the process 1000 ends. Otherwise, if the PMU 202 is in a compromised state (1008 NO), then the process 1000 continues to act 1014. At act 1014, DC power is supplied from the power module 904 to the LED 208 via the transfer switch 222, and from the power module 904 to the logic power supply 908. At act 1012, the process 1000 ends.

The SBU 204 can further include one or more indicators (not illustrated). For example, the SBU 204 can include an AC power status indicator that provides a visual indication of a power quality level of the AC power received from the AC input 206. The AC power status indicator can provide a visual indication that the AC power quality is unacceptable due to a power surge, for example, and provide a visual indication that the AC power quality is acceptable under normal (e.g., non-surge) operating conditions. In further examples, the SBU 204 can include a power source indicator that provides a visual indication denoting the source of power supplied to the LED lamp 208 (e.g., the PMU 202 or the SBU 204).

Figure 11:
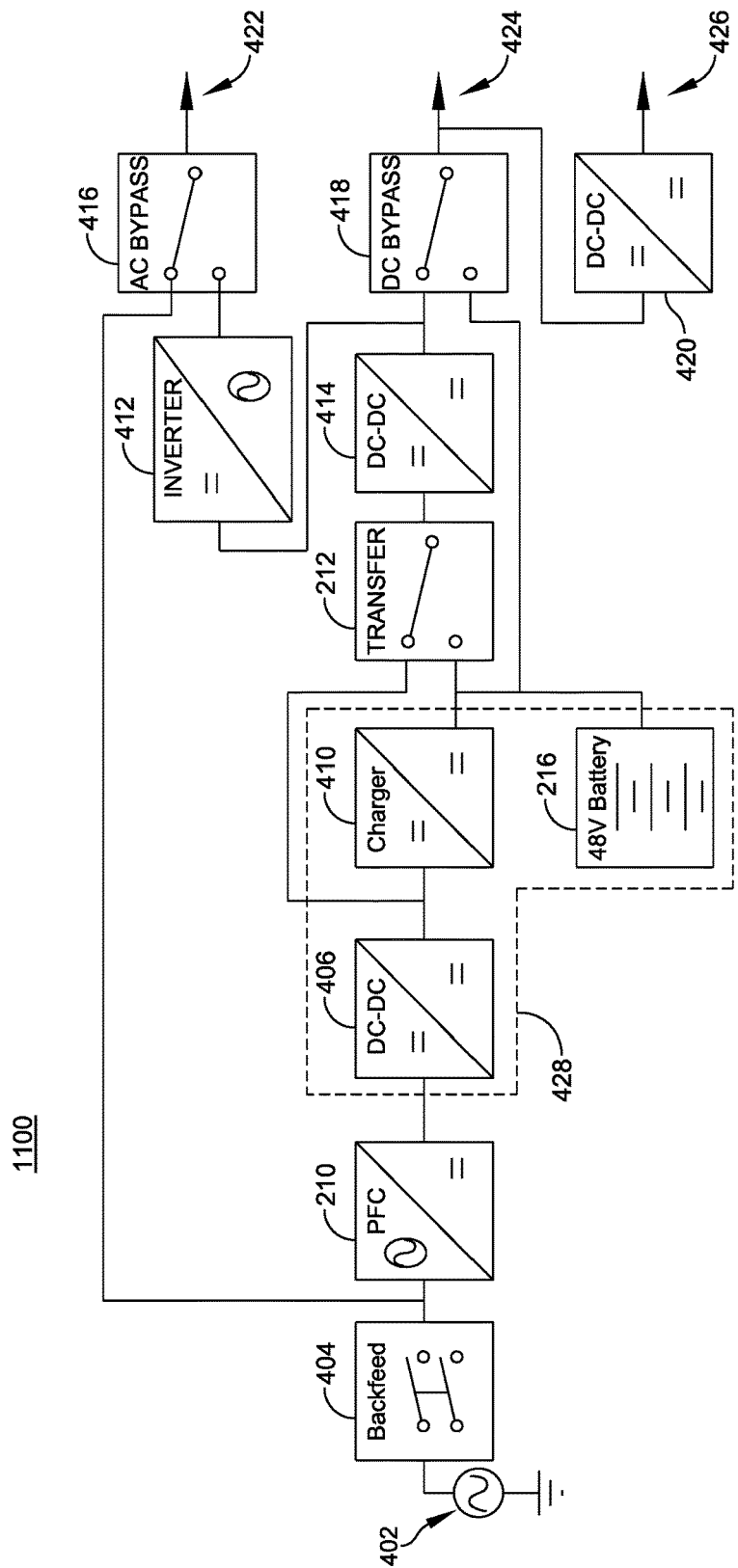
FIG. 11 is a block diagram of a power management unit in accordance with alternate embodiments of the disclosure.

FIG. 11 illustrates a block diagram of an alternate PMU 1100. In the alternate PMU block diagram 1100, the second DC-DC converter 408 is absent relative to the PMU block diagram 400. As described above with respect to the PMU block diagram 400, the second DC-DC converter 408 is, in the backup mode of operation, operable to receive DC power from the DC battery 216 (e.g., DC power rated at 48V DC), convert the received DC power to a different DC power level (e.g., DC power rated at 191V DC, 210V DC, etc.) and provide the converted DC power to the inverter 412. In the alternate PMU block diagram 1100, the third DC-DC converter 414 is operable to perform the same operations performed by the third DC-DC converter 414 in the PMU block diagram 400, in addition to supplying DC power to the inverter 412 as described above with respect to the second DC-DC converter 408.

For example, in the backup mode of operation, the DC battery 216 is operable to supply DC power (e.g., DC power rated at 48V DC) to the third DC-DC converter 414 via the transfer switch 212. The third DC-DC converter 414 receives the DC power from the DC battery 216, converts the received DC power (e.g., to DC power rated at 191V DC, 210V DC, etc.), and provides the converted DC power to the inverter 412. The inverter 412 receives the converted DC power, inverts the converted DC power to AC power (e.g., AC power rated at 120V AC), and provides the AC power to the AC output 422 via the AC bypass switch 416.

In the foregoing examples, deviations therefrom are within the scope of the disclosure. Any reference to specific values is meant to be non-limiting, and has been provided exclusively for purposes of clarity. For example, in some embodiments, the AC input 402 is operable to receive and supply AC power rated at a different voltage (i.e., a higher or lower voltage) than 120V (e.g., 64V AC, 180V AC, 250V AC, etc.). In addition, the inputs may be configured to be coupled to single-phase or multiple-phase power systems.

The AC output 422 can supply voltages different than the AC input 402 voltage (i.e., a higher or lower voltage), or may be configured to supply the same voltage as the AC input 402 (e.g., 64V AC, 120V AC, 180V AC, 250V AC, etc.). Furthermore, in some examples the first DC output 424 is operable to supply voltages different (i.e., higher or lower voltages) than 48V (e.g., 24V DC, 64V DC, etc.), and the second DC output 426 is operable to supply voltages different (i.e., higher or lower voltages) than 24V (e.g., 12V DC, 64V DC, etc.).

Components included in examples disclosed herein may be subject to alteration, removal or replacement. As discussed above, the power management system 200 is a modular system capable of operation absent one or more of the components disclosed herein. For example, in some embodiments the DC battery 216 may not necessarily be a single battery, and can instead be replaced or augmented by any suitable backup power supply (e.g., one or more fuel cells, a flywheel, a supercapacitor, etc.).

In one or more of the discussed modes of operation, the controller 224 can capture power usage information. For example, the controller 224 can record the power demand of each of the outputs (e.g., the AC output 422, the first DC output 424 and the second DC output 426) and perform data analysis on each power demand. The controller 224 can establish baseline information for each of the one or more outputs, and cumulative information for all of the outputs as a whole, to enable or enhance preemptive management of inefficient power supply operation, and detect anomalous power consumption situations that indicate a deviation from an established power usage trend. Furthermore, the controller 224 may be operable to automatically establish power usage alarm thresholds, or may receive manually-input power usage alarm threshold specifications. Responsive to a power usage alarm threshold being exceeded, the controller 224 can send a notification to an operator in some examples, while in others, the controller 224 can automatically take steps to reduce power consumption (e.g., by curtailing or eliminating power consumption by one or more outputs).

As discussed above, the charger 410 is operable to charge the DC battery 216 with DC power in the normal mode of operation. The first DC-DC converter 406, the charger 410 and the DC battery 216 together comprise a charging system 428, wherein the DC battery 216 can be a lead acid battery, a lithium ion battery, and so forth. Conventional charging systems for certain types of batteries involve various inefficiencies, as described in more detail below with respect to FIG. 12.

Figure 12:
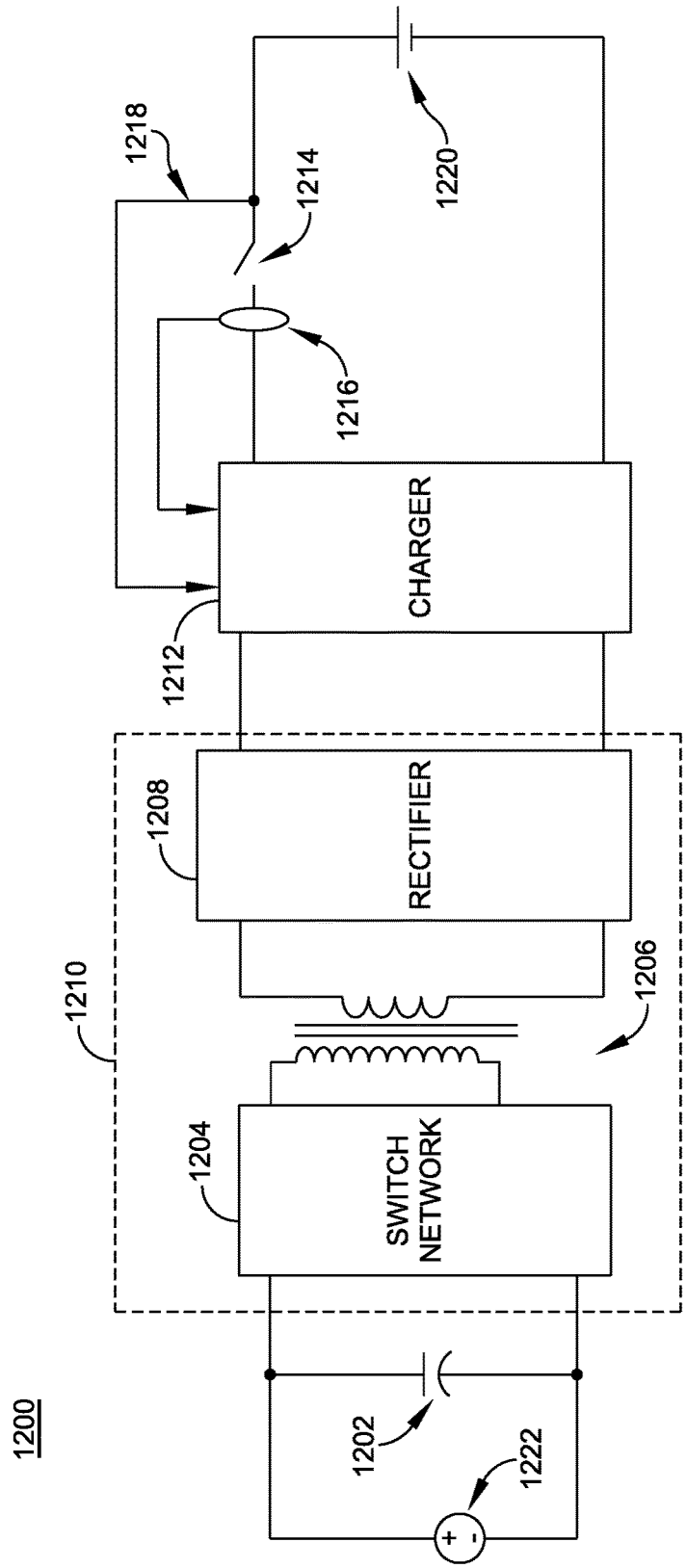
FIG. 12 is a block diagram of a traditional traffic light power system battery charger.

FIG. 12 illustrates a traditional charging system 1200 for use with a battery (e.g., a lead acid battery, a lithium ion battery, etc.) in a traffic light power system. The charging system 1200 includes a filtering capacitor 1202, a DC-DC converter 1210, a charger 1212, a switch 1214, current feedback 1216, voltage feedback 1218, a DC battery 1220 and a DC input 1222. The DC-DC converter 1210 includes a switch network 1204, transformer windings 1206 and a rectifier 1208.

The DC input 1222 is connected in parallel to the filtering capacitor 1202 at a first terminal and at a second terminal, and is connected in parallel to the switch network 1204 at the first terminal and at the second terminal. The filtering capacitor 1202 is connected in parallel to the DC input 1222 at a first terminal and at a second terminal, and is coupled to the switch network 1204 at the first terminal and at the second terminal. The switch network 1204 is connected in parallel to the DC input 1222 at a first terminal and at a second terminal, is connected in parallel to the filtering capacitor 1202 at the first terminal and at the second terminal and is connected in parallel to a primary winding of the transformer windings 1206 at a third terminal and a fourth terminal.

The primary winding of the transformer windings 1206 is connected in parallel to switch network 1204 at a first terminal and at a second terminal. A secondary winding of the transformer windings 1206 is connected in parallel to the rectifier 1208 at a first terminal and at a second terminal. The rectifier 1208 is connected in parallel to the secondary winding of the transformer windings 1206 at a first terminal and at a second terminal, and is connected in parallel to the charger 1212 at a third terminal and at a fourth terminal. The charger 1212 is connected in parallel to the rectifier 1208 at a first terminal and at a second terminal, is connected to the current feedback 1216 at a third terminal, is connected to the voltage feedback 1218 at a fourth terminal and is connected in parallel to the DC battery 1220 at a fifth terminal and via the switch 1214 at a sixth terminal. The DC battery 1220 is connected in parallel to the charger 1212 at a first terminal and via the switch 1214 at a second terminal.

As discussed above, the DC battery 1220 can be, but is not limited to, a lead acid battery. In normal operation, lead acid batteries are not typically discharged to zero volts. Rather, lead acid batteries typically retain a portion of a fully charged voltage level (e.g., 75% of the fully charged voltage level) even when considered to be fully discharged. Similar cases apply to other types of batteries, including, for example, lithium ion batteries. Accordingly, a voltage drop from a fully charged voltage level (e.g., 100% of a fully charged voltage level) to a discharged voltage level (e.g., 75% of a fully charged voltage level) is typically a comparatively small voltage drop (e.g., 25% of a fully charged voltage level). Traditional chargers are typically designed to handle the maximum battery voltage and current. As will now be discussed in more detail below with reference to FIG. 13, in at least one embodiment, a more efficient battery charger is used in place of the charging system described above.

Figure 13:
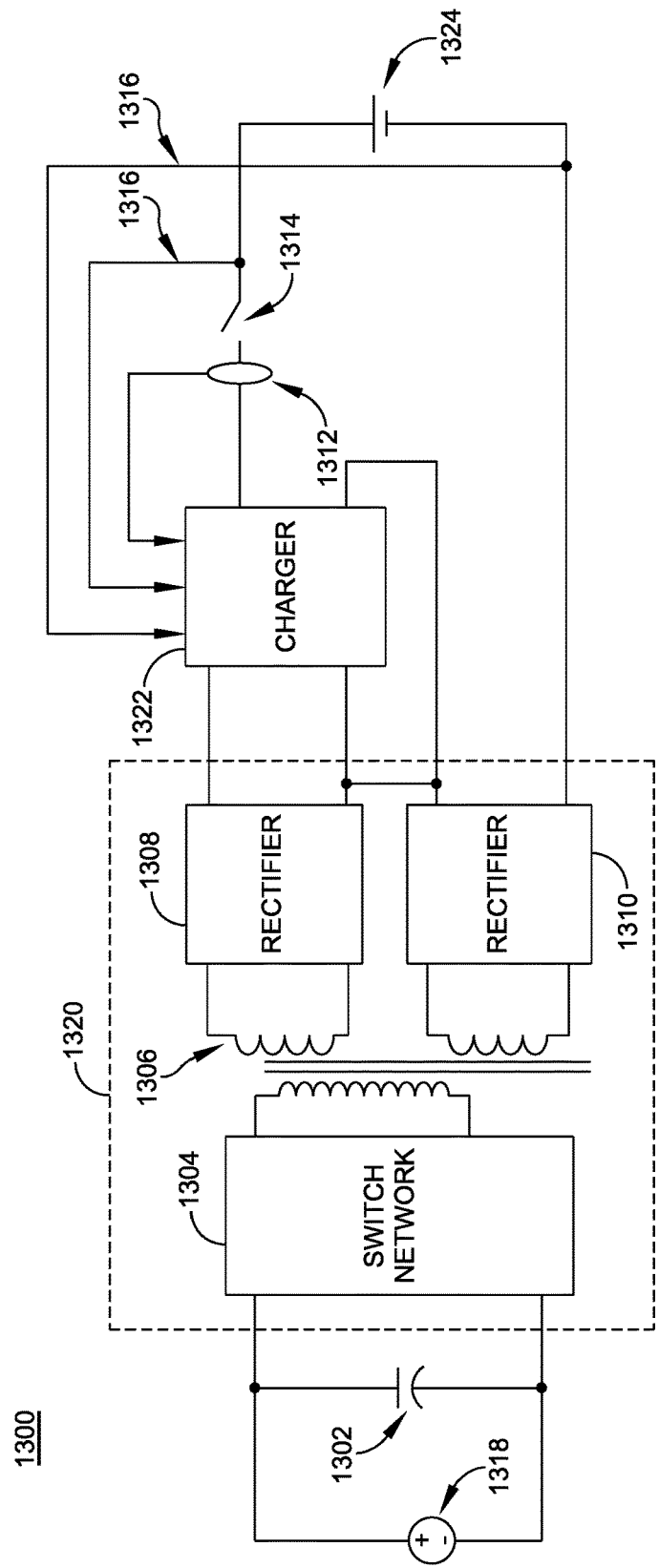
FIG. 13 is a block diagram of a traffic light power system battery charger in accordance with embodiments of the disclosure.

FIG. 13 illustrates an improved charging system 1300. The charging system 1300 includes a filtering capacitor 1302, current feedback 1312, a switch 1314, voltage feedback 1316, a DC voltage input 1318, a DC-DC converter 1320, a charger 1322, and a DC battery 1324. The DC-DC converter 1320 includes a switch network 1304, transformer windings 1306, a first rectifier 1308 and a second rectifier 1310.

The DC voltage input 1318 is connected in parallel to the filtering capacitor 1302 at a first terminal and at a second terminal, and is connected in parallel to the switch network 1304 at the first terminal and at the second terminal. The filtering capacitor 1302 is connected in parallel to the DC voltage input 1318 at a first terminal and at a second terminal, and is connected in parallel to the switch network 1304 at the first terminal and at a second terminal. The switch network 1304 is connected in parallel to the DC voltage input 1318 at a first terminal and at a second terminal, is connected in parallel with the filtering capacitor 1302 at a first terminal and at a second terminal, and is connected in parallel to a primary transformer winding of the transformer windings 1306 at a first terminal and at a second terminal.

The primary winding of the transformer windings 1306 is connected in parallel with the switch network 1304 at a first terminal and at a second terminal. A first secondary winding of the transformer windings 1306 is connected in parallel with the first rectifier 1308 at a first terminal and at a second terminal. A second secondary winding of the transformer windings 1306 is connected in parallel with the second rectifier 1310 at a first terminal and at a second terminal. The first rectifier 1308 is connected in parallel with the charger 1322 at a first terminal and at a second terminal, is connected in parallel to the first secondary transformer winding of the transformer windings 1306 at a third terminal and a fourth terminal, and is connected to the second rectifier 1310 at the second terminal. The second rectifier 1310 is connected in parallel to the second secondary winding of the transformer windings 1306 at a first terminal and at a second terminal, is connected to the charger 1322 and the first rectifier 1308 at a third terminal, and is connected to the DC battery 1324 at a fourth terminal.

The charger 1322 is connected in parallel to the first rectifier 1308 at a first terminal and at a second terminal, is connected to the second rectifier 1310 at a third terminal and at the second terminal, is connected to the voltage feedback 1316 at a fourth terminal and a fifth terminal, is connected to the current feedback 1312 at a sixth terminal, and is selectively connected to the DC battery 1324 via the switch 1314 at a seventh terminal. The DC battery 1324 is selectively coupled to the charger 1322 at a first terminal via the switch 1314 and is coupled to the second rectifier 1310 at a second terminal.

As discussed above, a voltage drop between a fully charged battery and a discharged battery may be less than the voltage rating of the fully charged battery (e.g., because the discharged battery has a positive voltage value), and a more efficient charger can be implemented with a voltage rating equivalent to the voltage drop.

For example, in the charging system 1300, the number of windings in the second secondary winding is designed such that the second rectifier 1310 provides a voltage substantially equivalent to the voltage of the DC battery 1324 when the DC battery 1324 is discharged (e.g., discharged to 75% of the battery voltage when the battery is fully charged). Similarly, the number of windings in the first secondary winding can be selected such that the first rectifier 1308 provides a voltage substantially equivalent to the voltage drop between the voltage level of the DC battery 1324 when fully charged and the voltage level of the DC battery 1324 when discharged. The charger 1322 can be connected in parallel with the first rectifier 1308 such that the charger 1322 is rated to substantially the same voltage as the first rectifier 1308, and the parallel connection of the charger 1322 and the first rectifier 1308 can further be connected in series with the second rectifier 1310 such that the voltage level output of the charger 1322 is additively stacked on top of the voltage level output of the second rectifier 1310.

In one example, the DC battery 1324 is rated at 48V when fully charged, and measures a voltage of 36V when discharged (i.e., 75% of the fully charged voltage). As discussed above, the second rectifier 1310 is designed to supply a voltage of 36V, and the first rectifier 1308 is designed to supply a voltage of 12V. The charger 1322 voltage range, therefore, spans from the second rectifier 1310 voltage (e.g., 36V) to the DC battery 1324 voltage (e.g., 48V). Accordingly, the charger 1322 is operable to supply power with a voltage of 12V in this example, rather than power with a voltage of 48V, thereby significantly reducing the charger 1322 power consumption (e.g., reducing power consumption by substantially 75% in this example) and enabling implementation of smaller, less expensive components in the charger 1322. The range of the charger 1322 voltage encompasses the range of the DC battery 1324 voltage. Therefore, the voltage of the battery 1324 when the battery 1324 is fully charged and the voltage of the battery 1324 when the battery 1324 is discharged are each within the range of the voltage provided by the charger 1322.

The charging system 1300 further includes current feedback elements 1312 and voltage feedback elements 1316 that are operable to provide control signals to the charger 1322 to control the current provided by the charger 1322 to charge the DC battery 1324. In addition, the voltage feedback 1316 elements can be used to detect if the DC battery 1324 voltage is outside of the voltage range supported by the charger 1322. If the voltage feedback elements 1316 sense that the DC battery 1324 voltage is outside of this range, then the switch 1314 can be actuated to an open position to prevent the charger 1322 from discharging to the DC battery 1324 under undesirable conditions. The current feedback element 1312 can be used to ensure that the charger 1322 is operable to provide a charging current output to which the DC battery 1324 is rated (e.g., 15 A, 18 A, 1.5 A, etc.).

Figure 14:
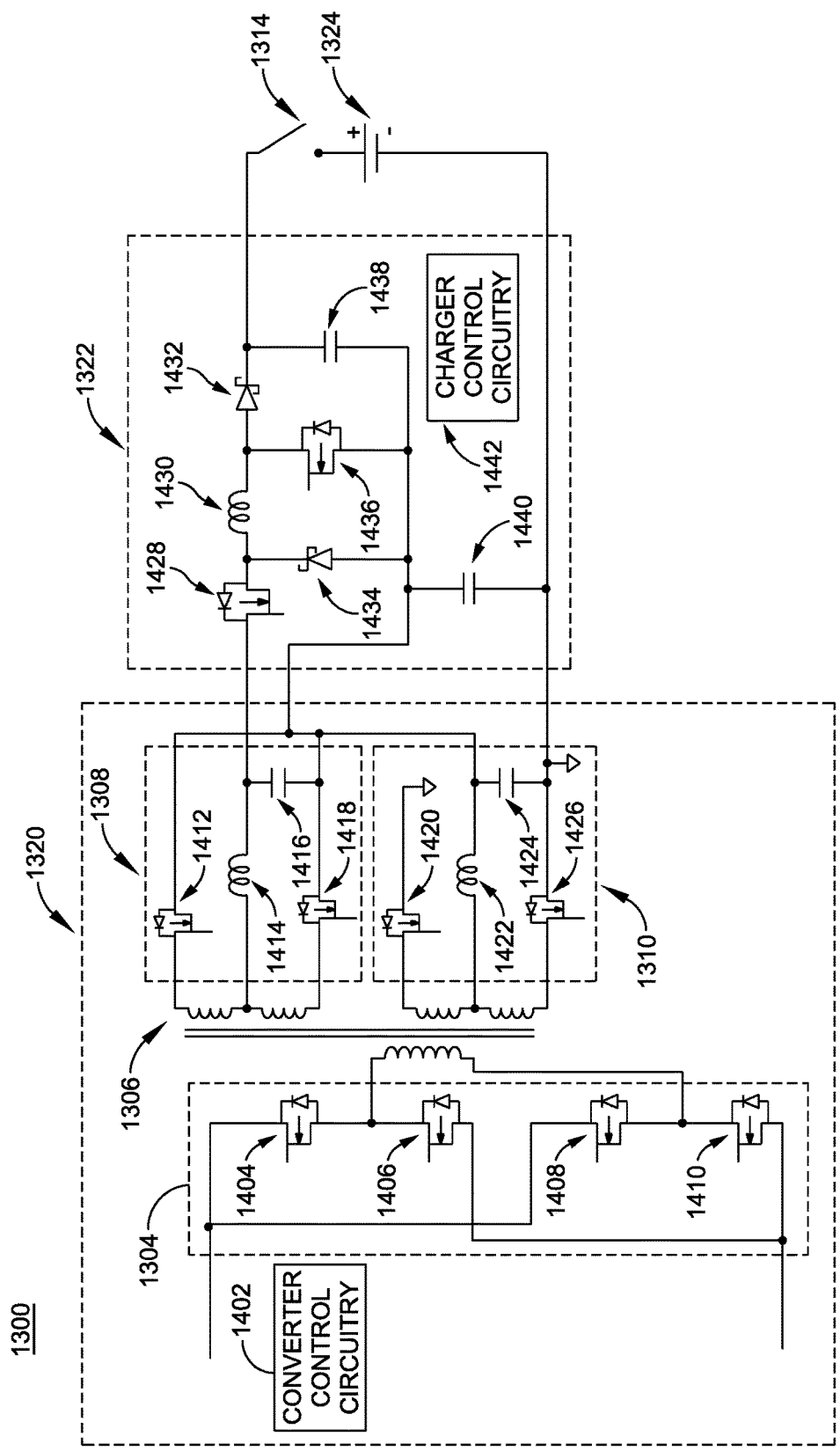
FIG. 14 is a block diagram of the traffic light power system battery charger in accordance with embodiments of the disclosure.

FIG. 14 illustrates components of the improved charging system 1300 in accordance with one embodiment in greater detail. For example, the improved charging system 1300 includes the switch 1314, the converter 1320, the charger 1322, and the DC battery 1324. The converter 1320 includes converter control circuitry 1402, the switch network 1304, the transformer windings 1306, a first rectifier 1308 and the second rectifier 1310. The switch network 1304 includes a first switch 1404, a second switch 1406, a third switch 1408 and a fourth switch 1410.

The first rectifier 1308 includes a first switch 1412, an inductor 1414, a capacitor 1416 and a second switch 1418. The second rectifier 1310 includes a first switch 1420, an inductor 1422, a capacitor 1424 and a second switch 1426. The charger 1322 includes a first switch 1428, an inductor 1430, a first diode 1432, a second diode 1434, a second switch 1436, a first capacitor 1438, a second capacitor 1440 and charger control circuitry 1442.

The converter control circuity 1402 is operable to supply control signals to components of the converter 1320, and the charger control circuitry 1442 is operable to supply control signals to components of the charger 1322.

As discussed above, the second rectifier 1310 is, in some examples, operable to provide power rated at a first voltage (e.g., 36V) to the charger 1322. Furthermore, the first rectifier 1308 is operable to provide power rated at a second voltage (e.g., 12V) to the charger 1322. The charger 1322 is configured such that power received at the charger 1322 from the second rectifier 1310 substantially bypasses at least some of the charger 1322 circuit components. The use of the second rectifier 1310 coupled in series with the parallel combination of the first rectifier 1308 and the charger 1322 effectively biases the charger 1322 to a voltage of 36V.

The exemplary battery charging system(s) described herein can be used, in some examples, to provide a more efficient battery charger. By redistributing a portion of a power output burden from the battery charger directly to a rectifier of the DC-DC converter, the battery charger can be smaller, less expensive, and can dissipate less power as heat. Deviations from any examples given herein are within the scope of the disclosure, and any reference to specific values has been provided exclusively for purposes of descriptive clarity.

For example, a voltage measurement of a discharged battery (e.g., a lead acid battery, a lithium ion battery, etc.) may differ from the examples given herein. A voltage measurement of a discharged lead acid battery, depending on the application, may be, for example, 0%, 40%, 65%, 95%, 100%, etc. of a voltage measurement of the battery when fully charged. Furthermore, a battery can measure one of many voltages when fully charged, for example, 24V, 52.5V, 96V, etc.

In other embodiments, the charger 1300 described above for use in an intelligent traffic system may be used in other applications that utilize uninterruptible power supplies, as well as other systems that use battery chargers including electric vehicles and mobile devices. In embodiments described above, the charger 1322 receives DC power from the first rectifier 1308 and the second rectifier 1310, which in turn receive AC power from the transformer windings 1306. In alternate embodiments, the first 1308 and the second rectifier 1310 receive DC power from, for example, one or more DC buses, which in turn may be connected to one or more devices capable of producing DC power. Furthermore, in some embodiments, the charger 1322 is operable to be coupled to the first rectifier 1308 and the second rectifier 1310, which in turn are configured to be coupled to each other. In other embodiments, the charger 1322 is operable to be coupled individually to the first rectifier 1308 and the second rectifier 1310, but the first rectifier 1308 and the second rectifier 1310 are not configured to be coupled to each other.

Figure 15:
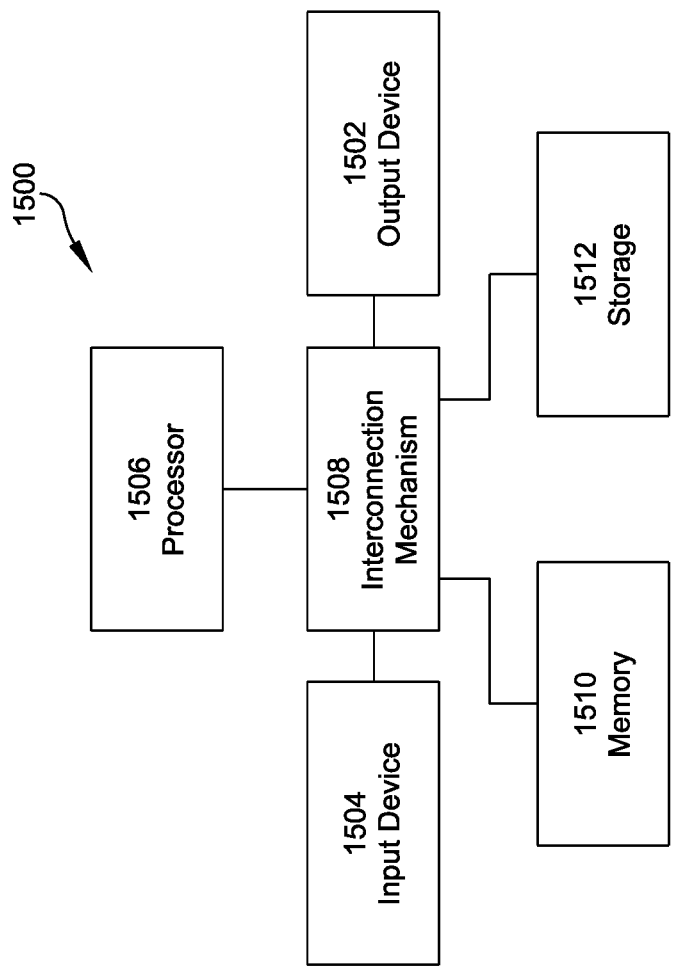
FIG. 15 is a block diagram of one example of a computer system that may be used to perform processes and functions disclosed herein.

FIG. 15 illustrates an example block diagram of computing components forming a system 1500 which may be configured to implement one or more aspects disclosed herein. The system 1500 may include for example a general-purpose computing platform such as those based on Intel PENTIUM-type processor, Motorola PowerPC, Sun Ultra-SPARC, Texas Instruments-DSP, Hewlett-Packard PA-RISC processors, or any other type of processor. System 1500 may include specially-programmed, special-purpose hardware, for example, an application-specific integrated circuit (ASIC). Various aspects of the present disclosure may be implemented as specialized software executing on the system 1500 such as that shown in FIG. 15.

The system 1500 may include a processor/ASIC 1506 connected to one or more memory devices 1510, such as a disk drive, memory, flash memory or other device for storing data. Memory 1510 may be used for storing programs and data during operation of the system 1500. Components of the computer system 1500 may be coupled by an interconnection mechanism 1508, which may include one or more buses (e.g., between components that are integrated within a same machine) and/or a network (e.g., between components that reside on separate machines). The interconnection mechanism 1508 enables communications (e.g., data, instructions) to be exchanged between components of the system 1500.

The system 1500 also includes one or more input devices 1504, which may include for example, a keyboard or a touch screen. The system 1500 includes one or more output devices 1502, which may include for example a display. In addition, the computer system 1500 may contain one or more interfaces (not shown) that may connect the computer system 1500 to a communication network, in addition or as an alternative to the interconnection mechanism 1508.

The system 1500 may include a storage system 1512, which may include a computer readable and/or writeable nonvolatile medium in which signals may be stored to provide a program to be executed by the processor or to provide information stored on or in the medium to be processed by the program. The medium may, for example, be a disk or flash memory and in some examples may include RAM or other non-volatile memory such as EEPROM. In some embodiments, the processor may cause data to be read from the nonvolatile medium into another memory 1510 that allows for faster access to the information by the processor/ASIC than does the medium. This memory 1510 may be a volatile, random access memory such as a dynamic random access memory (DRAM) or static memory (SRAM). It may be located in storage system 1512 or in memory system 1510. The processor 1506 may manipulate the data within the integrated circuit memory 1510 and then copy the data to the storage 1512 after processing is completed. A variety of mechanisms are known for managing data movement between storage 1512 and the integrated circuit memory element 1510, and the disclosure is not limited thereto. The disclosure is not limited to a particular memory system 1510 or a storage system 1512.

The system 1500 may include a general-purpose computer platform that is programmable using a high-level computer programming language. The system 1500 may be also implemented using specially programmed, special purpose hardware, e.g. an ASIC. The system 1500 may include a processor 1506, which may be a commercially available processor such as the well-known Pentium class processor available from the Intel Corporation. Many other processors are available. The processor 1506 may execute an operating system which may be, for example, a Windows operating system available from the Microsoft Corporation, MAC OS System X available from Apple Computer, the Solaris Operating System available from Sun Microsystems, or UNIX and/or LINUX available from various sources. Many other operating systems may be used.

The processor and operating system together may form a computer platform for which application programs in high-level programming languages may be written. It should be understood that the disclosure is not limited to a particular computer system platform, processor, operating system, or network. Also, it should be apparent to those skilled in the art that the present disclosure is not limited to a specific programming language or computer system. Further, it should be appreciated that other appropriate programming languages and other appropriate computer systems could also be used.

Having thus described several aspects of at least one embodiment, it is to be appreciated various alterations, modifications, and improvements will readily occur to those skilled in the art. Such alterations, modifications, and improvements are intended to be part of this disclosure, and are intended to be within the scope of the disclosure. Accordingly, the foregoing description and drawings are by way of example only.

What is claimed is:

1. A battery charging system comprising:
 a first input and a second input configured to receive an input voltage;
 a first battery output and a second battery output configured to couple to a battery to provide an output voltage;
 a transformer having a primary winding coupled to the first input and to the second input, and having a first secondary winding and a second secondary winding;
 a first rectifier having a first input coupled to the first secondary winding and having a first output and a second output;
 a second rectifier having an input coupled to the second secondary winding and having a first output and a second output, wherein the first output of the second rectifier is coupled to the second output of the first rectifier and the second output of the second rectifier is coupled to the second battery output; and
 a charger having a first input coupled to the first output of the first rectifier and a second input coupled to the first output of the second rectifier, and having a first output coupled to the first battery output, and being configured to provide a charging current to the battery coupled to the first battery output and to the second battery output, wherein the second rectifier is configured to generate, based on power received from the second secondary winding, a bias voltage, and to provide the bias voltage to the second output of the first rectifier and the second input of the charger to bias the first rectifier and the charger to the bias voltage.

2. The system of claim 1, further comprising a switch configured to be connected between the charger and the battery.

3. The system of claim 2, further comprising a controller configured to:
 open the switch in response to determining that a battery voltage is outside of an operating range; and
 close the switch in response to determining that the battery voltage is within the operating range.

4. The system of claim 1, wherein the first battery output and the second battery output are configured to couple to a lead acid battery.

5. The system of claim 1, wherein the system is configured to provide a fully charged battery voltage at the first and second battery output, and wherein the first rectifier is configured to provide a first voltage to the charger, the first voltage being substantially equivalent to twenty-five percent of the fully charged battery voltage.

6. The system of claim 5, wherein the bias voltage is substantially equivalent to seventy-five percent of the fully charged battery voltage.

7. The system of claim 6, wherein the charger is configured to generate a first power at a second voltage, the second voltage being substantially equivalent to the difference between the first voltage and the bias voltage.

8. A method for operating a battery charging system, the method comprising:
 receiving, by a first rectifier, a first AC voltage;
 receiving, by a second rectifier, a second AC voltage;
 converting, by the first rectifier, the first AC voltage to a first DC voltage;
 converting, by the second rectifier, the second AC voltage to a second DC voltage;
 biasing, by the second rectifier, the first rectifier with the second DC voltage;
 biasing, by the second rectifier, a battery charger with the second DC voltage;
 providing, by the first rectifier, a biased voltage to the battery charger; and
 providing, by the battery charger, a second power to a battery.

9. The method of claim 8, further comprising:
 receiving, by a switch network, an input DC voltage;
 converting, by the switch network, the input DC voltage to an input AC voltage;
 providing, by the switch network, the input AC voltage to a transformer;
 providing, by the transformer, the first AC voltage to the first rectifier; and
 providing, by the transformer, the second AC voltage to the second rectifier.

10. The method of claim 8, further comprising coupling, selectively by a switch, the battery to the battery charger.

11. The method of claim 10, further comprising:
 opening the switch in response to a determination that a voltage level of the battery is outside of an operating range; and
 closing the switch in response to a determination that the voltage level of the battery is within the operating range.

12. The method of claim 8, wherein the battery is a lead acid battery.

13. The method of claim 8, wherein providing, by the battery charger, a second power to a battery includes providing to the battery a voltage substantially equal to a fully charged battery voltage.

14. The method of claim 8, wherein the first DC voltage is substantially equal to twenty-five percent of the fully charged battery voltage, and the second DC voltage is substantially equal to seventy-five percent of the fully charged battery voltage.

* * * * *